United States Patent [19]
Hirokane et al.

[11] Patent Number: 5,659,537
[45] Date of Patent: Aug. 19, 1997

[54] MAGNETO-OPTICAL RECORDING MEDIUM AND METHOD OF REPRODUCING FROM SAME

[75] Inventors: Junji Hirokane, Nara; Junichiro Nakayama; Michinobu Mieda, both of Shiki-gun; Akira Takahashi, Nara, all of Japan

[73] Assignee: Sharp Kabushiki Kaisha, Osaka, Japan

[21] Appl. No.: 459,338

[22] Filed: Jun. 2, 1995

[30] Foreign Application Priority Data

Dec. 27, 1994 [JP] Japan .................................. 6-326387

[51] Int. Cl.$^6$ ...................................................... G11B 7/00
[52] U.S. Cl. ........................... 369/275.2; 369/100; 369/13
[58] Field of Search ..................................... 369/13, 275.1, 369/275.2, 275.5, 283, 284, 93, 94, 59, 114, 100

[56] References Cited

U.S. PATENT DOCUMENTS 5,278,810  1/1994  Takahashi et al. .................... 369/13

OTHER PUBLICATIONS

"MSR Disks with Three Magnetic Layers using In-Plane Magnetization Films" (N. Nishimura et al., The MORIS '94, 29–K–04, p. 125.

"Magnetically–Induced Super Resolution using Magneto--Static Coupling" (K. Tamanoi et al., The MORIS '94, 29–K–05, p. 126).

"New Readout Technique using Domain Collapse on Magnetic Multilayer" H. Miyamoto, et al., The MORIS '94, 29–K–06, p. 127).

*Primary Examiner*—Muhammad N. Edun
*Attorney, Agent, or Firm*—David G. Conlin; Brian L. Michaelis

[57] ABSTRACT

A recording layer including a recording magnetic domain for recording thereon information is formed. A reproducing layer for reproducing information by projecting thereto a light beam is formed on the recording layer. A non-magnetic intermediate layer for intercepting a magnetic exchange coupling force exerted between the recording layer and the reproducing layer is formed between the recording layer and the reproducing layer. The reproducing layer is arranged such that the width of the stable magnetic domain on the reproducing layer at room temperature is larger than the width of the recording magnetic domain in the recording layer. At a reproducing temperature by the light beam, the width of the stable magnetic domain becomes smaller than the width of the recording magnetic domain, and the information is copied by the leakage magnetic flux of the recording magnetic domain. Depending on whether or not the information transferred to the reproducing layer is reproduced, the effects from other magnetic domain adjacent to the magnetic domain to be reproduced from the reproducing layer can be prevented, thereby enabling a high density recording of information on the recording layer.

15 Claims, 15 Drawing Sheets

FIG. 12 (a)
FIG. 12 (b)
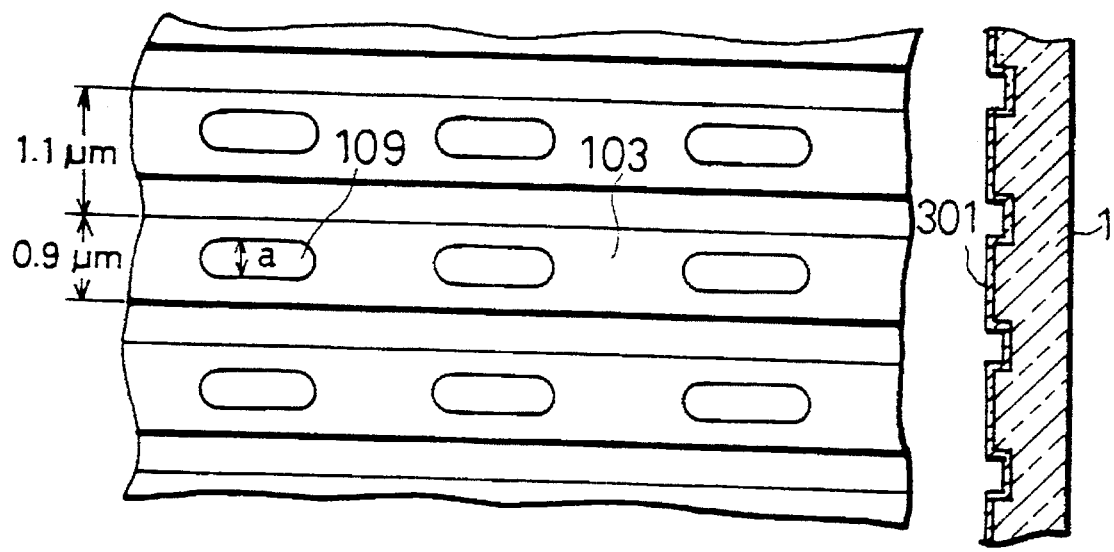
FIG. 13
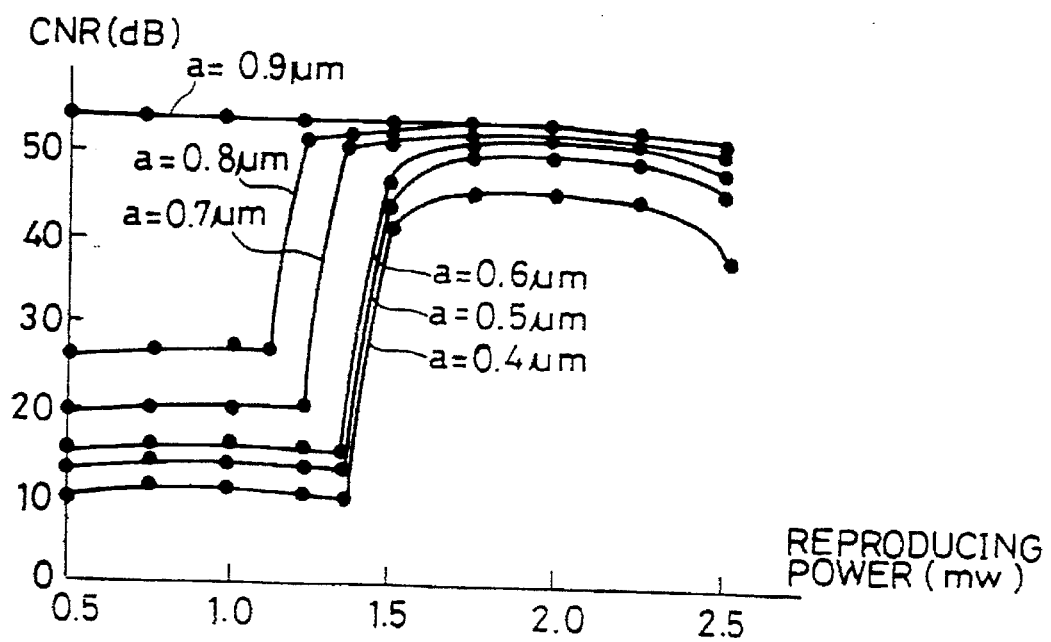

MAGNETO-OPTICAL RECORDING MEDIUM AND METHOD OF REPRODUCING FROM SAME

FIELD OF THE INVENTION

The present invention relates to a magneto-optical recording medium for use in a magneto-optical recording and reproducing apparatus, such as a magneto-optical disk, a magneto-optical tape, a magneto-optical card, etc., and the method of reproducing from the same.

BACKGROUND OF THE INVENTION

Conventionally, a magneto-optical disk memory has been used as a rewritable magneto-optical recording medium in its practical application. Such magneto-optical disk memory has such a drawback in that when a recording bit diameter and an interval between the recording bits are smaller with respect to a diameter of the light beam from a semiconductor laser converged on the magneto-optical memory, reproducing characteristics deteriorate.

The described problem is caused by the following reason. As the adjoining recording bits also fall within the diameter of spot of the laser beam on the target recording bit, it is not possible to reproduce each recording bit separately.

In order to counteract the above-mentioned problem, Japanese Laid-Open Patent Publication No. 81717/1993 (Tokukaihei 5-81717) discloses a superresolution magneto-optical reproducing technique. More concretely, as shown in FIG. 22 (a) and FIG. 22(b), a recording bit 201 is formed along each track 203 on the substrate 200. In this state, a laser beam 205 is projected onto a reproducing layer 3'. Then, the reproducing layer 3' and the recording layer 4' show respective temperature distributions with respect to a light intensity distribution of the light beam 205. Here, the reproducing layer 3' has an in-plane magnetization at room temperature, while has a perpendicular magnetization in response to a temperature rise.

The polar Kerr effect used as reproducing means for the magneto-optical recording medium is obtained only from a perpendicular magnetization component of the reproducing layer 3' whereon the light beam 205 is projected. Therefore, a perpendicular magnetization is shown only in the irradiated area with the light beam 205, i.e., the central portion having a temperature rise in a spot 206 of the laser beam on the reproducing layer 3', thereby permitting the reproducing signal to be obtained from the reproducing layer 3'.

As a result, only the magnetization state in the recording bit 201 at the central portion of the laser beam spot 206 of the recording layer 4' is copied to the reproducing layer 3' by the exchange interaction. While other recording bits 202 of the reproducing layer 3' show the in-plane magnetization, thereby enabling only information on the recording bit 201 to be reproduced.

For the above-mentioned reason, even if the diameter of each recording bit 201, 202 or an interval between the recording bits 201 and 202 is made smaller than the diameter of the spot 206 of the laser beam, the recording bits 201 and 202 can be reproduced, thereby enabling information recorded at high density to be reproduced.

However, in the described conventional arrangement, a still improved recording density of respective recording bits 201 and 202 are restricted by the problem associated with the reproducing operation.

More specifically, the reproducing layer 3' of the described prior art document, in general, has properties such that a transition gradually occurs from in-plane magnetization to perpendicular magnetization as the temperature thereof is raised. Here, since the temperature of recording bit 202 adjoining to the recording bit 201 to be reproduced is also raised, the magnetization in the reproducing layer 3' in the adjoining recording bit 202 is arranged in an intermediate direction in a process of changing from the in-plane direction and the perpendicular magnetization, thereby having a component in the perpendicular magnetization direction.

For the described reason, when reproducing information recorded on the recording bit 201, a perpendicular magnetization component in the adjoining recording bit 202 is also reproduced, thereby presenting the problem that each recording bit 202 cannot be reproduced by completely separating a signal from the recording bit 201.

Therefore, there is a restriction for reducing the size of the recording bits 201 and 202 and the interval between the recording bits 201 and 202 associated with the reproducing operation, thereby presenting the problem that a still improved recording density cannot be achieved.

SUMMARY OF THE INVENTION

An object of the present invention is to provide a magneto-optical recording medium which offers an improved recording density of information compared with conventional magneto-optical recording media.

Another object of the present invention is to provide a method of reproducing from a magneto-optical recording medium which permits information recorded at high density based on magnetization direction to be more stably reproduced compared with conventional magneto-optical recording media.

In order to achieve the above object, the first magneto-optical recording medium in accordance with the present invention is characterized by including:

a recording layer composed of a magnetic thin film with perpendicular magnetization, including a recording magnetic domain for recording thereon information, the recording layer generating a leakage magnetic flux;

a reproducing layer composed of a magnetic thin film with perpendicular magnetization, including a reproducing magnetic domain for transferring thereto a magnetization direction from the recording magnetic domain, wherein a width of a stable magnetic domain which possibly exists in a reproducing magnetic domain is larger than a width of a recording magnetic domain at room temperature and smaller than a width of the recording magnetic domain at an elevated predetermined temperature above room temperature; and an intermediate layer composed of a non-magnetic substance, the intermediate layer being formed between the recording layer and the reproducing layer for intercepting an exchange coupling force exerted between the recording layer and the reproducing layer.

According to the described arrangement, first, at room temperature, since the width of the stable magnetic domain in the reproducing magnetic domain is larger than the width of the recording magnetic domain, the reproducing magnetic domain does not exist within the width of the recording magnetic domain. Moreover, by the intermediate layer, the exchange coupling force exerted between the reproducing layer and the recording layer are intercepted. Therefore, even with a small coercive force of the reproducing layer, the magnetization direction in the reproducing magnetic domain will not be arranged in the magnetization direction in the recording magnetic domain.

In the reproducing process, when a temperature is raised, for example, by a light beam such as a laser beam, the width of a stable magnetic domain of the reproducing magnetic domain varies and becomes smaller than the width of the recording magnetic domain. Therefore, when the width of the stable magnetic domain of the reproducing magnetic domain becomes closer to the width of the recording magnetic domain, the magnetization direction in the recording magnetic domain is transferred to the recording magnetic domain by the leakage magnetic flux from the recording magnetic domain.

Here, the irradiated portion of the reproducing layer by the light beam shows such a temperature distribution that the temperature becomes higher from the peripheral portion towards the central portion. This enables the reproducing layer has a characteristic such that the width of the stable magnetic domain is smaller than the width of the recording magnetic domain in the central portion. As a result, information recorded on the recording layer can be reproduced only from the central portion through the reproducing layer by the projection of the light beam.

In the described arrangement, the reproducing layer is arranged such that when temperature is raised by the light beam for detecting the magnetization direction of the reproducing magnetic domain when reproducing, the width of the stable magnetic domain varies and becomes smaller than the width of the recording magnetic domain. Therefore, a coercive force of other reproducing magnetic domains than the reproducing magnetic domain having a temperature rise by the light beam to a point where the width of the stable magnetic domain becomes smaller than the width of the recording magnetic domain, and the magnetic coupling between the recording layer and the reproducing layer is small. As a result, the direction of the other reproducing magnetic domain can be easily arranged in the first magnetization direction, for example, by the external magnetic field.

As a result, in the described arrangement, only in the reproducing magnetic domain corresponding to the recording magnetic domain having the second magnetization direction different from the first magnetization direction, the magnetization direction is arranged in the second magnetization direction by the projection of the light beam. On the other hand, the magnetization direction in other reproducing magnetic domains adjoining to the reproducing magnetic domain can be maintained the first magnetic domain.

In the reproducing process, when detecting the magnetization direction in the reproducing magnetic domain whereon the magnetization direction in the recording magnetic domain is copied, an adverse effect from the magnetization direction in an other adjoining reproducing magnetic domain whereon the light beam is projected can be prevented.

Since this enables a smaller size of each recording magnetic domain and a smaller interval between the recording magnetic domains than the conventional magneto-optical recording medium, a still improved recording density of information recorded on the recording layer can be achieved.

The second magneto-optical recording medium having the arrangement of the first magneto-optical recording medium in accordance with the present invention is characterized in that when the temperature of the reproducing magnetic domain is raised, and the width of the stable magnetic domain of the reproducing magnetic domain becomes identical with the width of the recording magnetic domain, the magnetization direction in the recording magnetic domain is copied to the reproducing magnetic domain by the leakage magnetic flux.

In this arrangement, in the process of raising the temperature of the reproducing magnetic domain by the light beam, when the width of the stable magnetic domain becomes identical with the width of the recording magnetic domain, the magnetization direction in the recording magnetic domain is copied to the reproducing magnetic domain by the leakage magnetic flux, and the copied magnetization direction is detected by the light beam. As a result, the reproducing signal to be detected shows a sharp rise, thereby improving a quality of the reproducing signal.

The third magneto-optical recording medium having the arrangement of the first magneto-optical recording medium in accordance with the present invention, is characterized in that the recording layer includes the first recording magnetic domain and the second recording magnetic domain respectively having perpendicular magnetizations in anti-parallel directions, wherein the width of the first recording magnetic domain is larger than the width of the second recording magnetic domain, and the stable magnetic domain of the reproducing layer becomes smaller than the second recording magnetic domain, and the reproducing layer has the stable magnetic domain having a width as small as that of the second recording magnetic domain when temperature rises.

According to this arrangement, since the width of the stable magnetic domain in the reproducing layer is set substantially as small as the width of the second recording magnetic domain when temperature rises, the magnetization direction in the second recording magnetic domain in the recording layer can be detected through the magnetization direction in the stable magnetic domain in the reproducing layer.

Additionally, since the width of the first recording magnetic domain is set larger than the width of the second recording magnetic domain, at room temperature, the magnetization direction in the magnetic domain of the reproducing layer can be arranged in the magnetization direction of the first recording magnetic domain.

Moreover, the reproducing layer is arranged such that when the temperature thereof is raised, the width of the stable magnetic domain is set substantially as small as the second recording magnetic domain. Therefore, with a temperature rise by the light beam, the respective magnetization directions in the first and second recording magnetic domains in the recording layer can be detected by the light beam through the reproducing magnetic domains respectively corresponding to the first and second recording magnetic domains.

Since the width of the first recording magnetic domain is set larger than the width of the second recording magnetic domain, the width of the stable magnetic domain can be set made smaller than the width of the first recording magnetic domain. As a result, the magnetization direction in the first reproducing magnetic domain as the reproducing magnetic domain corresponding to the first recording magnetic domain can be arranged in the magnetization direction in the first recording magnetic domain.

In the second reproducing magnetic domain corresponding to the second recording magnetic domain, the magnetization direction in the other second reproducing magnetic domain than the second reproducing magnetic domain whereon the magnetization direction in the second recording magnetic domain having a substantially same width is copied in response to a temperature rise by the light beam will not be affected by the magnetization direction in the second recording magnetic domain. Therefore, by the first reproducing magnetic domain having a magnetization arranged in the magnetization direction in the first recording magnetic domain, the magnetization direction of the other second reproducing magnetic domain can be arranged in the magnetization direction in the first recording layer.

As a result, in the described arrangement, the magnetization direction in other reproducing magnetic domains than the reproducing magnetic domain being projected with a central portion of a light beam can be arranged in the magnetization direction in the first recording magnetic domain by the leakage magnetic flux generated from the recording magnetic domain in the first recording magnetic layer. Therefore, the magnetization direction in the reproducing magnetic domain can be arranged in the magnetization direction, for example, in the first recording magnetic domain, thereby eliminating the external magnetic field for initialization.

The first method of reproducing from the first magneto-optical recording medium in accordance with the present invention is characterized by including the steps of:

preparing the first magneto-optical recording medium;

arranging beforehand the perpendicular magnetization in the reproducing layer in one direction;

projecting a light beam onto the reproducing layer whose perpendicular magnetization is arranged in one direction beforehand, so as to raise a temperature of the reproducing layer until a width of a stable magnetic domain of the reproducing magnetic domain becomes smaller than a width of the recording magnetic domain;

copying a magnetization direction in the recording magnetic domain to the reproducing magnetic domain having a temperature rise to a point where the width of the stable magnetic domain in the reproducing magnetic domain is smaller than the width of the recording magnetic domain by the light beam; and detecting a reproducing signal for reproducing information by a reflected light beam from the reproducing magnetic domain.

According to the first method, by arranging beforehand the magnetization direction in the reproducing magnetic domain in one direction, when the magnetization direction in the recording magnetic domain is copied to the magnetization direction in the reproducing magnetic domain corresponding to the recording magnetic domain in response to a temperature rise by the light beam, an effect from the magnetization direction in other reproducing magnetic domains adjacent to the reproducing magnetic domain can be reduced.

Since this permits a more stable detection of the copied magnetization direction than the conventional method, information recorded at high density on the recording magnetic domain in the recording layer based on the magnetization direction can be reproduced.

The second method of reproducing from the magneto-optical recording medium in accordance with the present invention including the steps of the first method is characterized in that in the step of arranging beforehand the perpendicular magnetization direction in one direction in the reproducing layer, by arranging the external magnetic field to be generated from an opposite surface whereon a light beam is projected, the magnetization direction in other reproducing magnetic domains than the reproducing magnetic domain having a magnetization direction copied from the recording magnetic domain in response to a temperature rise by the light beam can be arranged in one direction.

According to the second method, in response to a temperature rise, the magnetization direction in other reproducing magnetic domains adjacent to the reproducing magnetic domain having a magnetization direction copied from the recording magnetic domain can be arranged in one direction by the external magnetic field. As a result, improved quality of information detected from the reproducing magnetic domain having a magnetization copied by the light can be achieved.

Moreover, since the external magnetic field can be used also as the recording magnetic field for writing the magnetization direction in the recording magnetic domain of the recording layer, an external magnetic field generating device is not needed, thereby preventing an apparatus employing the recording medium from being larger in size.

The third method of reproducing from the first magneto-optical recording medium in accordance with the present invention including the steps of the first method is characterized by further including the step of differentiating the reproducing signal detected from the reproducing magnetic domain.

In the third method, since the reproducing signal for reproducing information is differentiated, a sharper rise of the reproducing signal can be achieved, and the position of the reproducing magnetic domain can be more accurately detected. Therefore, even the information recorded at higher density by reducing the size of the recording magnetic domain can be reproduced through the reproducing magnetic domain by the light beam. As a result, information can be recorded on the recording layer at still higher density.

BRIEF DESCRIPTION OF THE DRAWINGS

FIG. 1(a) and FIG. 1(b) are explanatory views showing magneto-optical recording medium and a reproducing method of the present invention, wherein: FIG. 1(a) is a schematic plan view, and FIG. 1(b) is a view showing a schematic configuration.

FIG. 12(a) and FIG. 12(b) are explanatory views showing the recording method.

FIG. 13 is a graph showing recording and reproducing characteristics in the recording method.

DETAINED DESCRIPTION OF THE PREFERRED EMBODIMENTS

EMBODIMENT 1

The following descriptions will discuss one embodiment of the present invention.

Figure 2:
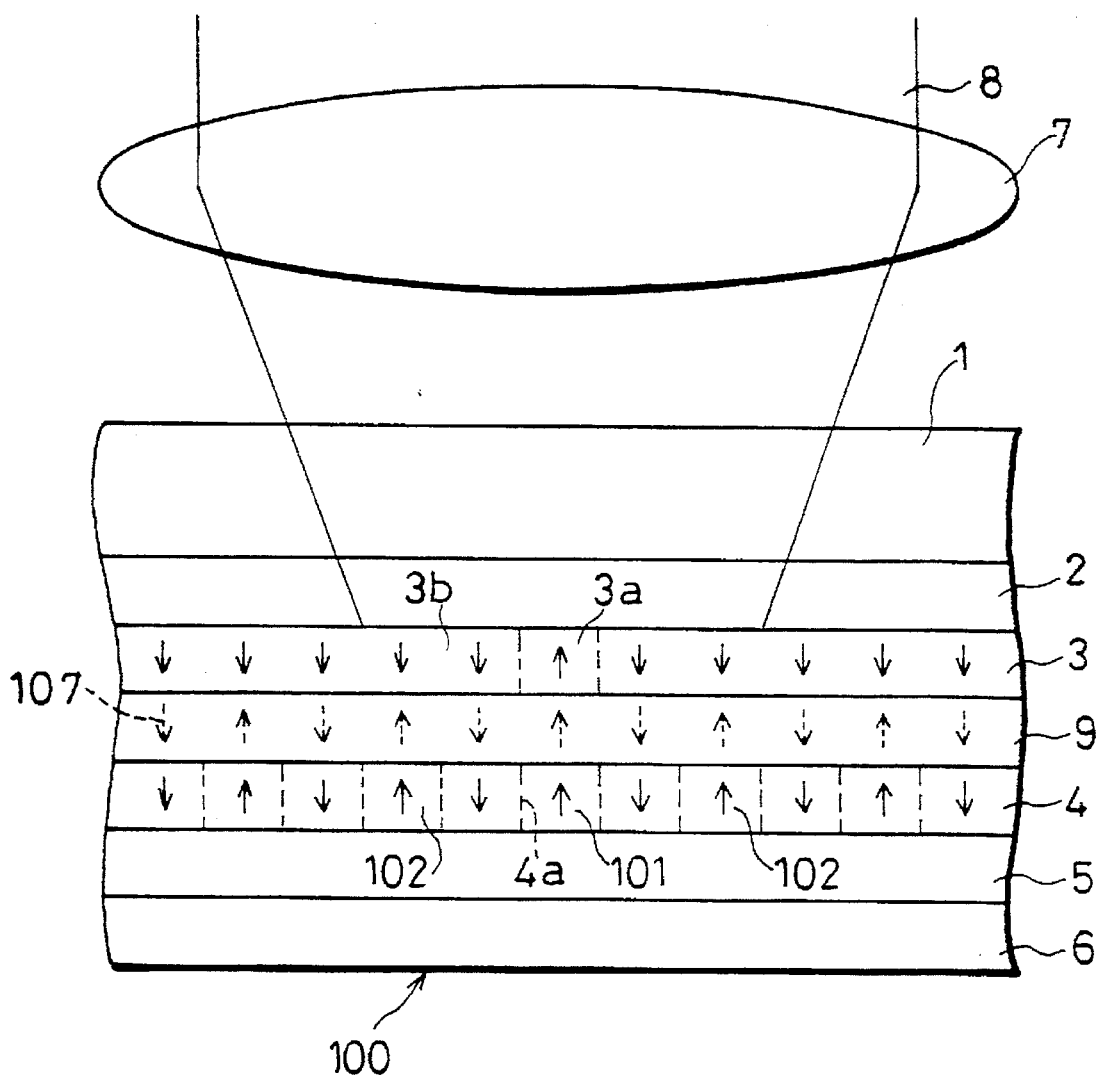
FIG. 2 is an explanatory view showing the configuration of the magneto-optical recording medium.

As illustrated in FIG. 2, a magneto-optical recording medium in accordance with the present embodiment is composed of a disk main body 100 including a substrate 1, a transparent dielectric layer 2, a reproducing layer 3, a non-magnetic intermediate layer 9 (intermediate layer), a recording layer 4, a protective layer 5 and an overcoat film 6 which are laminated in this order. The substrate 1 formed in a disk shape is made of a transparent material such as polycarbonate.

The described magneto-optical recording medium adopts the recording system based on Curie temperature. Namely, a light beam 8 (laser beam from a semiconductor) is converged onto a reproducing layer 3 by an objective lens 7, and information recording and reproducing operations are performed utilizing the magneto-optical effect known as the polar Kerr effect, i.e., a polarization plane of reflected light rotates in an reverse direction according to the magnetization direction in the magnetic layer having a magnetization in a direction perpendicular to a light incident surface.

The recording layer 4 is a magnetic thin film with perpendicular magnetization made of rare earth-transition metal alloy. The recording layer 4 includes recording bits 101 and 102 for recording therein digital information using perpendicular magnetizations which are parallel in mutually opposite directions. The recording bits 101 and 102 are recording-use magnetic domains for recording therein information.

The reproducing layer 3 is composed of a magnetic thin film with perpendicular magnetization made of rare earth-transition metal alloy. The reproducing layer 3 is formed on the recoding layer 4 and includes reproducing bits for copying thereto the magnetization direction from the recording bits 101 and 102. A reproducing bit suggests a reproduction-use magnetic domain for reproducing information.

The reproducing layer 3 has characteristics such that the compensation temperature of the magnetic thin film with perpendicular magnetization is around room temperature. Further, at around the reproducing temperature, the saturation magnetization in the reproducing layer 3 is maximized in response to a temperature rise. Moreover, the reduced amount of the coercive force in a process of rising from room temperature to the reproducing temperature is smaller than the increased amount of the saturation magnetization.

In order to stabilize small bits in the magneto-optical recording medium, a minimum diameter $d_{min}$ as the width of the stable magnetic domain which enables a cylindrical magnetic domain having an opposite direction in the magnetic thin film with perpendicular magnetization is in proportion to $\sigma_w$, and in inverse-proportion to the product of $M_s$ and $H_c$. Here, $M_s$ is the saturation magnetization, i.e., a voluntary magnetization in the magnetic domain, $H_c$ is a coercive force, and $\sigma_w$ is a density of the magneto-static energy of the magnetic wall.

As described, when the compensation temperature is set in a vicinity of room temperature like the reproducing layer 3, the coercive force $H_c$ of the reproducing layer 3 becomes larger in a vicinity of the compensation temperature, and then, as temperature is raised from the compensation temperature, the coercive force $H_c$ becomes smaller. On the other hand, the saturated magnetization $M_s$ of the reproducing layer 3 is reduced to zero at compensation temperature, and as the temperature is raised from the compensation temperature, the saturated magnetization $M_s$ of the reproducing layer 3 becomes larger, and is maximized at a predetermined temperature, i.e., around the reproducing temperature. Then, the saturation magnetization $M_s$ is reduced to zero again at the Curie temperature of the reproducing layer 3.

In the reproducing layer 3 having the described composition, a change in coercive force $H_c$ in response to a temperature rise is smaller than a change in saturation magnetization $M_s$ in response to a temperature rise, and a constant change in density of electro-static energy of the magnetic wall is shown in response to the temperature rise. Therefore, the reduced amount of width of the stable magnetic domain in response to temperature rise from room temperature to the reproducing temperature is assumed to be caused by the saturation magnetization $M_s$.

As a result, the width of the stable magnetic domain in the reproducing bit can be made larger than the width 4a of the magnetic domain of the recording bits 101 and 102 at room temperature. On the other hand, when the temperature of the reproducing bit is raised by a projecting of a light beam 8 for detecting the magnetization direction of the reproducing bit, the width of the stable magnetic domain is gradually reduced and becomes smaller than the width 4a of the magnetic domain.

The non-magnetic intermediate layer 9 is formed between the recording layer 4 and the reproducing layer 3, for intercepting the exchange interaction, i.e., the magnetic coupling force exerted between the reproducing layer and the recording layer 4. The exchange interaction determines the magnetic moment of two magnetic substances, i.e., the relative direction of the spin.

Figure 1:
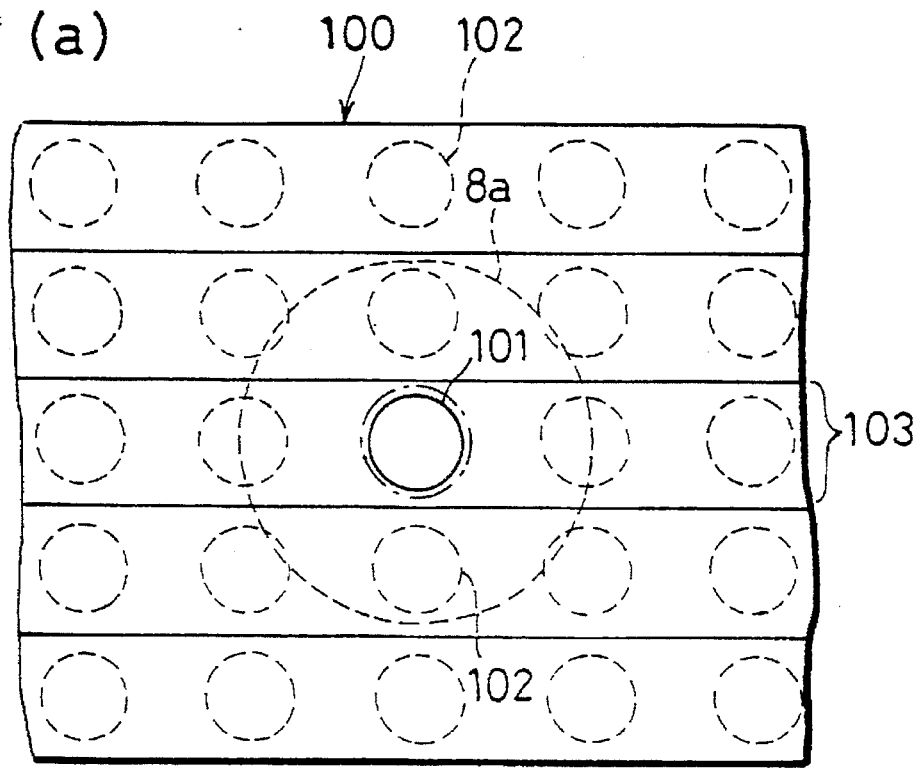
Figure 1:
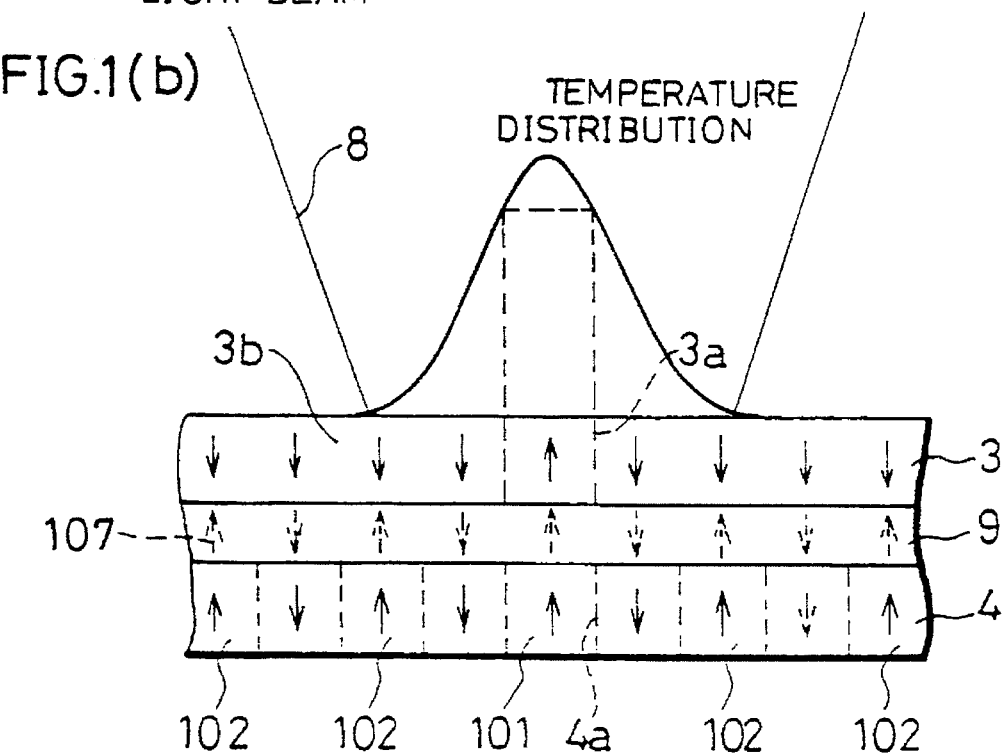
Figure 22A:
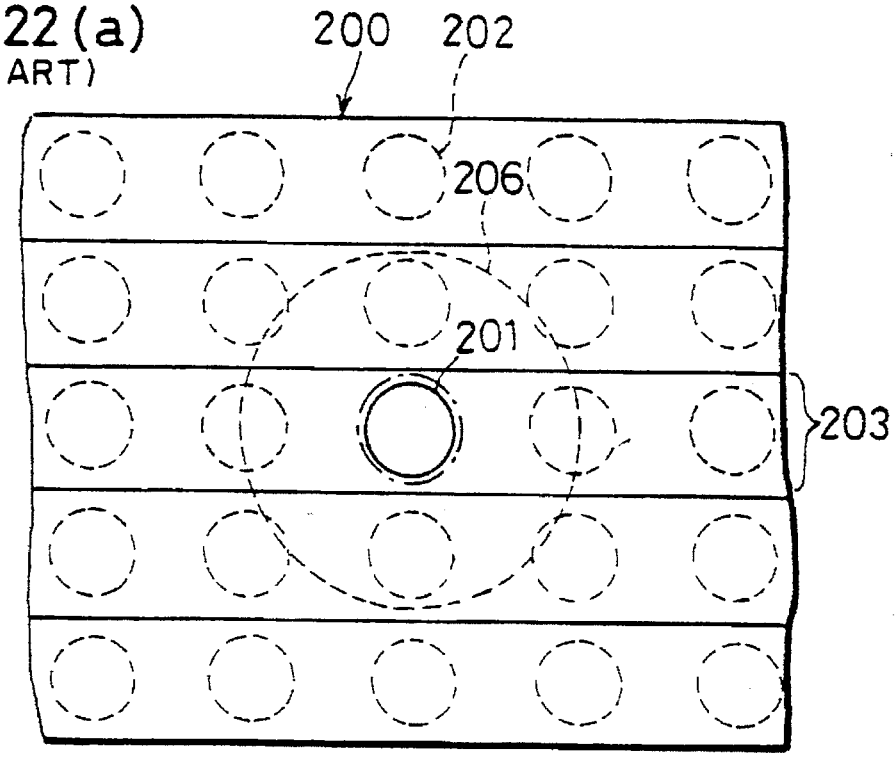
FIG. 22(a) and FIG. 22(b) are explanatory views showing the conventional magneto-optical recording medium.
Figure 22B:
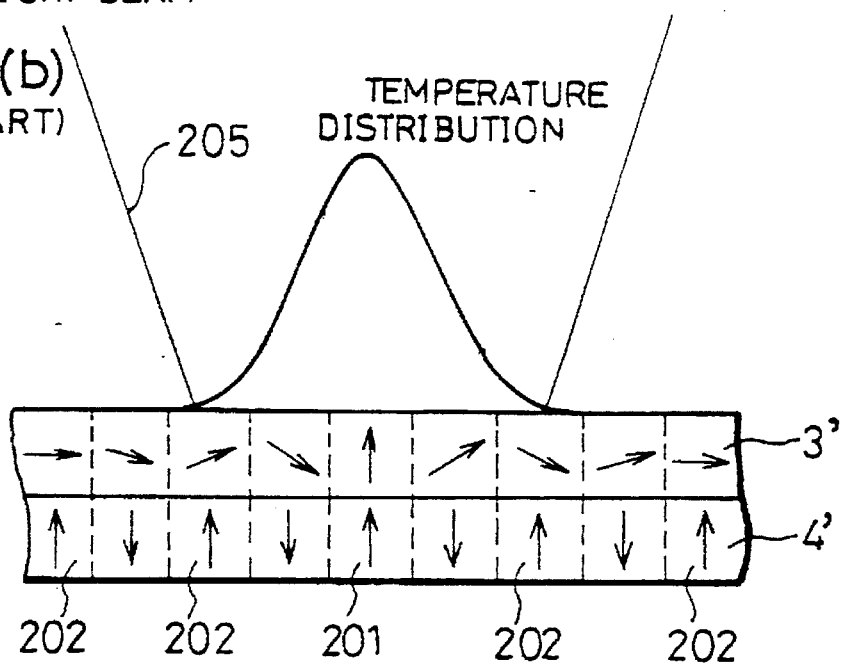

In the arrangement shown in FIG. 1(a) and FIG. 1(b), as in the case of the conventional arrangement shown in FIG. 22(a) and FIG. 22(b), along the track 103 formed in a spiral form or concentric form, the recording bits 101 and 102 are formed at a predetermined interval.

In the described arrangement, as the width of the stable magnetic domain of the reproducing bit in the reproducing layer 3 at room temperature is larger than the width of the magnetic domain 4a, it is not possible that the reproducing bit has the same width as the recording bits 101 and 102.

As described, since the exchange coupled force exerted between the reproducing layer 3 and the recording layer 4 is intercepted by the intermediate layer 9, the direction of the magnetization in the reproducing bit can be prevented from being arranged in the magnetization direction of the recording bit by the exchange coupled force.

As a reproducing bit having a width corresponding to the width of the recording bits 101 and 102 of the reproducing layer 3 at room temperature is unstable, the magnetization will not be reversed with respect to the leakage magnetic flux 107 generated from the recording layer 4.

In this state, the light beam 8 is converged onto the reproducing layer 3, and the same temperature distribution is shown on the reproducing layer 3 and the recording layer 4 in response to the intensity distribution (like Guassian distribution) of the light beam 8.

Namely, an irradiated portion on the reproducing layer 3 with the light beam 8 has such a temperature distribution that the temperature becomes gradually higher from the peripheral portion towards the center. Therefore, the reproducing layer 3 can be set such that the width of the stable magnetic domain is smaller than the width of the recording bit 101 only at the central portion. This enables information recorded on the recording layer 4 to be reproduced through the reproducing layer 3 by the light beam 8 only from the central portion.

As the temperature is raised by the projection of the light beam 8, the width of the stable magnetic domain of the reproducing bit is made smaller. Therefore, since the reproducing bit with the size corresponding to the recording bit 101 can be formed in a stable condition, the reversed magnetization, etc., by the leakage magnetic flux 107 generated from the recording layer 4 can be copied.

Moreover, in the described arrangement, when detecting by the light beam 8 the magnetization direction of the reproducing bit 3a wherein the magnetization direction of the recording bit 101 is copied in response to a temperature rise by the projection of the light beam 8, the effect from the magnetization direction in other reproducing bits 3b than the reproducing bit 3a can be avoided.

In the described arrangement, the reproducing layer 3 is arranged such that when the temperature thereof is raised by the projection of the light beam 8 for detecting the magnetization direction in the reproducing bit 3a, the width of the stable magnetic domain becomes smaller than the width of the recording bit 101. Therefore, other reproducing bits 3b than the reproducing bit 3a subject to the temperature rise to the point at which the width of the stable magnetic domain varies and becomes smaller than the width of the recording bit 101 by the projection of the light beam 8 has a small magnetic coupling force exerted between the reproducing layer 3 and the recording layer 4. As a result, it is possible that other reproducing bits 3b can be arranged in one magnetization direction, for example, in a downward direction (first magnetization direction) by the external magnetic field or the like.

In the described arrangement, even if the magnetization direction in the reproducing bit 3a corresponding to the recording bit 101 having an upward magnetization direction (second magnetization direction) is switched from downward to upward by the projection of the light beam 8, the magnetization direction in other reproducing bits 3b adjoining to the reproducing bit 3a will not be switched. Therefore, when detecting the magnetization direction in the reproducing bit 3a corresponding to the recording bit by the light beam 8, the effect from the magnetization direction in other reproducing bits 3b can be prevented.

Therefore, since the effect from other reproducing bits 3b adjoining to the reproducing bit 3a detected by the light beam 8 can be prevented, the size of each recording bit 101, 102, and the interval between the recording bits 101 and 102 can be reduced, thereby achieving a higher recording density of the information compared with those of the conventional method.

As described, since only the information in the recording bit 101 corresponding to the central portion of the spot 8a subject to the temperature rise can be copied to the reproducing layer 3, the information of the recording bit 101 to be reproduced can be detected independently of adjoining recording bits 102. Therefore, even if the respective recording densities of the recording bits 101 and 102 are raised, the information recorded in the recording bits 101 and 102 can be reproduced through the reproducing layer 3 in a stable condition.

In other words, only in the central portion subject to the temperature rise of the spot 8a of the light beam 8, the magnetization direction in the reproducing bit 3a in the reproducing layer 3 is reversed corresponding to the recording bit 101 of the recording layer 4, while in other portions whose temperature is not raised or slightly raised, the magnetization in the reproducing layer 3 is not reversed, thereby achieving a magnetic superresolution technique depending on whether or not the reproducing bit 3a is reversed.

The method of manufacturing the magneto-optical recording medium having the above-mentioned arrangement will be explained.

In the sputtering device provided with targets of Al, GdFeCo alloy and DyFeCo alloy, the substrate 1 formed in a disk shape made of polycarbonate having formed thereon pregroove and prepit is placed on a substrate holder, and air is exhausted from the sputtering device to $1\times10^{-6}$ Torr, and mixed gas of argon and nitrogen is introduced therein, and an electric power is supplied to the Al target, and under the gas pressure of $4\times10^{-3}$ Torr, the transparent dielectric film 2 made of AlN was formed.

In order to achieve an improved reproducing characteristic, the film thickness of the transparent dielectric film 2 is set to a value obtained by dividing ¼ of the wavelength of the reproducing light by the refractive index of the transparent dielectric film 2. For example, when the reproducing light beam with a wavelength of 680 nm is used, the transparent dielectric film 2 may be set to the thickness in a range of 10 nm to 80 nm. In the present embodiment, the transparent dielectric film 2 having a thickness of 50 nm is adopted.

Next, again, air was exhausted from the sputtering device to $1\times10^{-6}$ Torr, and argon gas was introduced therein. Then, an electric power was supplied to the GdFeCo alloy target, and under the gas pressure of $4\times10^{-3}$ Torr, the reproducing layer 3 made of Gd0.20(Fe0.60Co0.40)0.50 is formed on the transparent dielectric layer 2. The reproducing layer 3 is a TM rich composition where the amount of the TM (transition metal) moment is always greater than the amount of the RE (rare earth) metal metal. The Curie temperature of the reproducing layer 3 is 420° C., and the compensation temperature thereof is 10° C.

It is preferable that the reproducing layer 3 has a thickness of not less than 10 nm because with this thickness, the magnetization information recorded on the recording layer 4 is outputted in a form of a signal. Moreover, if the reproducing layer 3 becomes too thick, the larger laser power of the light beam 8 is required for raising the temperature, which would cause the recording sensitivity to drop. For the described reason, it is preferable that the reproducing layer 3 has a thickness of not more than 100 nm. In the present embodiment, the reproducing layer 3 with a thickness of 40 nm is adopted.

In the next stage, the non-magnetic intermediate layer 9 made of AlN is formed on the reproducing layer 3 by introducing a mixed gas of argon and nitrogen into the sputtering device under the gas pressure of $4\times10^{-3}$. It is preferable that the non-magnetic intermediate layer 9 has a thickness of not more than 60 nm in order to effectively transmit the leakage magnetic flux 107 generated from the recording layer 4. It is also preferable that the non-magnetic intermediate layer 9 has a thickness of not less than 1 nm in order to prevent a magnetic exchange coupling force to be exerted directly between the reproducing layer 3 and the recording layer 4. In the present embodiment, the non-magnetic intermediate layer 9 with a thickness of 5 nm is adopted.

After air was exhausted from the sputtering device to $1\times10^{-6}$ Torr, and argon gas was introduced therein, and an electric power was supplied to the DyFeCo alloy target, and under the gas pressure of $4\times10^{-3}$ Torr, the recording layer 4 made of $Dy0.23(Fe0.75Co0.25)0.77$ is formed on the non-magnetic intermediate layer 9. The recording layer 4 is composed of a magnetic thin film with perpendicular magnetization. The compensation temperature of the recording layer 4 is in a vicinity of room temperature and Curie temperature thereof is 250° C.

It is preferable that the recording layer 4 has a thickness of not less than 30 nm in order to generate a leakage magnetic flux 107 required for reversing the magnetization of the reproducing pit 3a of the reproducing layer 3. On the other hand, if the recording layer 4 becomes too thick, a larger laser power of the light beam 8 is required for raising the temperature, which would be the cause of lowering the recording sensitivity. Therefore, it is preferable that the recording layer 4 has a thickness of not more than 200 nm. In the present embodiment, the recording layer 4 having a thickness of 60 nm is adopted.

Next, a mixed gas of argon and nitrogen is introduced into the sputtering device, and a power is applied to the Al target, thereby forming the protective layer 5 made of AlN on the recording layer 4 under the same condition of forming the transparent dielectric layer 2.

The thickness of the protective layer 5 is not limited as long as the recording layer 4 can be protected from corrosion due to oxidization, etc. It is preferable that the thickness of the protective layer 5 is not less than 5 nm. In the present embodiment, the protective layer 5 with a film thickness of 20 nm is adopted.

The overcoat film 6 is formed on the protective layer 5 by applying an ultraviolet ray hardening resin or a thermal hardening resin by spin-coating. Then, a projection of the ultraviolet ray or an application of heat is carried out.

Figure 3:
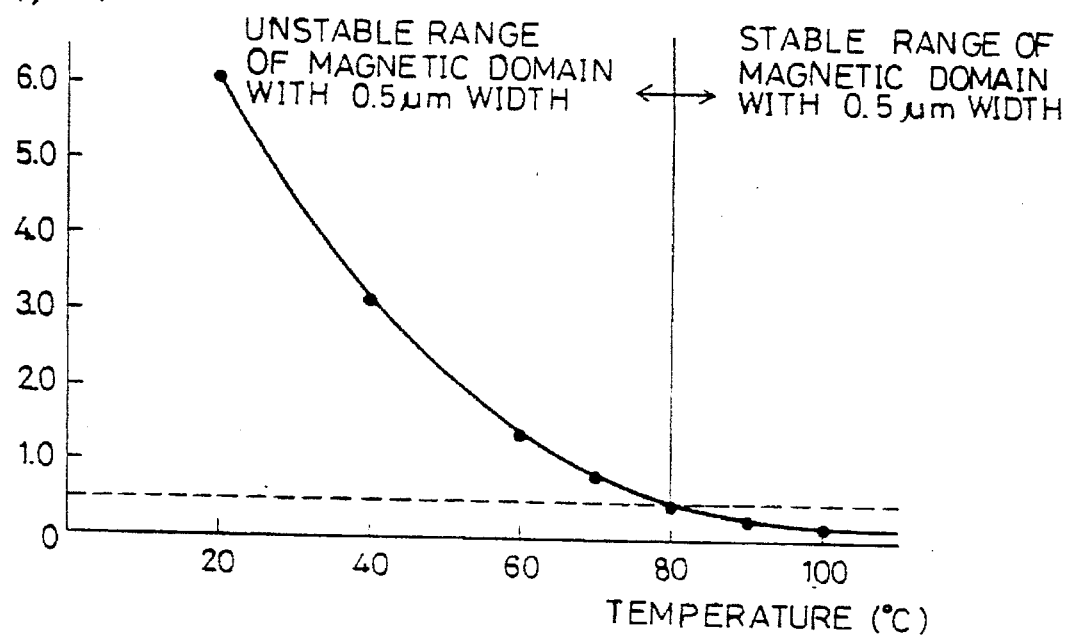
FIG. 3 is a graph showing magnetic properties of a reproducing layer in the magneto-optical recording medium.

As a comparative example, a recording medium composed of a substrate 1 consisting of only the reproducing layer 3 and the protective layer 5 is formed. Using the comparative sample, the temperature dependency of the stable magnetic domain width of the reproducing layer 3 is examined. The results of the experiment are shown in the graph of FIG. 3. For the stable magnetic width, the magnetic domain width of a stripe shape which ensures a stable condition at each temperature is adopted.

As is clear from FIG. 3, the width of the stable magnetic domain becomes smaller as temperature is raised. For example, at room temperature, the magnetic domain having a width of 0.5 μm does not exist in a stable condition in the reproducing layer 3. However, as the temperature of the reproducing layer 3 is raised, the magnetic domain having such width exits in the almost stable condition.

The recording and reproducing characteristics are examined with respect to the magneto-optical recording medium prepared in the first embodiment.

Figure 4:
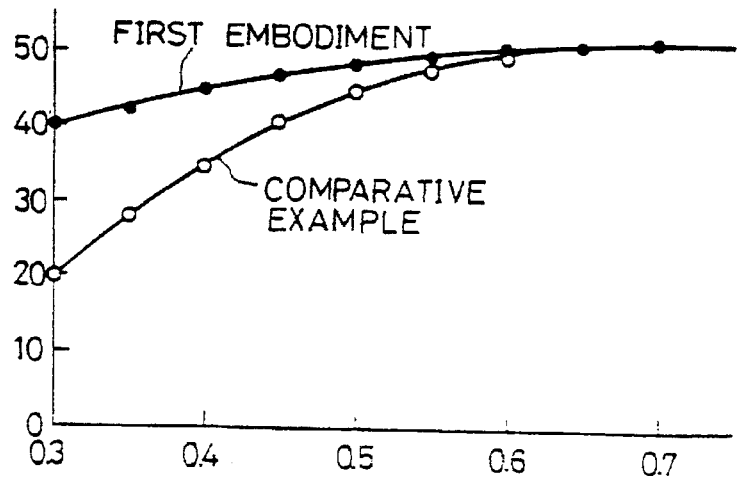
FIG. 4 is a graph showing recording and reproducing characteristics of the magneto-optical recording medium.

FIG. 4 shows a mark length dependency of the CNR (carrier to noise ratio) in the magneto-optical recording medium. After arranging the magnetization direction in the recording layer 4 in one direction, the light beam 8 with a laser power of 6 mW is projected at a linear velocity of 5 m/s with a recording magnetic field of 10 kA/m, and after forming the recording bit with a different mark length at a doubled pitch, the CNR was measured with the reproducing laser power of 2 mW. The results are as shown in FIG. 4.

For comparison, as an arrangement for excluding the non-magnetic intermediate layer 9, in the conventional arrangement shown in FIG. 22(a) and FIG. 22(b), the same measurement are performed with respect to the magneto-optical recording medium using the reproducing layer 3' made of $Gd0.28(Fe0.82Co0.18)0.72$. The results are also shown in FIG. 4. In such comparative example, the magnetic exchange coupled force is exerted between the reproducing layer 3 and the recording layer 4. Therefore, the recording magnetic field of 65 kA/m is required for desirably performing a recording operation.

On the other hand, in the magneto-optical recording medium of the present embodiment includes the non-magnetic intermediate layer 9 for intercepting the magnetic exchange coupling force exerted between the reproducing layer 3 and the recording layer 4. Therefore, information can be recorded on the recording layer 4 using a recording magnetic field of low intensity of around 10 kA/m as in the case where a recording layer 4 is used alone.

As shown in FIG. 22(a) and FIG. 22(b), in the arrangement of the comparative example, the information on each adjoining recording bit 201 may interfere with information on the recording bit 201 to be reproduced. On the other hand, in the arrangement of the first embodiment, as shown in FIG. 1(a) and FIG. 1(b), the magnetization in the reproducing layer 3 corresponding to the adjoining recording bits 102 is perfectly coincident with the magnetization direction in the surrounding area, thereby preventing interferences by signals from the adjoining bits 102 with the information on the recording bit 101 to be reproduced. As a result, a still higher CNR can be obtained especially in a short mark length with respect to a comparative example.

As is clear from FIG. 4, the magneto-optical recording medium in accordance with the first embodiment offers a CNR of 40 dB which is by far higher than that of the comparative example, even with respect to the recording bit with a mark length of 0.3 μm and a mark pitch of 0.6 μm.

In the measurement of the CNR of the present invention, an optical system adjoining the laser beam with a wavelength of 830 nm is adopted, and it is known that the recording bit to be reproduced and the adjoining recording bits cannot be separated completely with respect to the normally recorded recording bit with a mark length of 0.3 μm and a mark pitch of 0.6 μm.

Namely, in the case of reproducing the normally recorded recording bit with a mark length of 0.3 μm and a mark pitch of 0.6 μm by the projection of a laser beam having a wavelength of 830 nm, the CNR becomes zero.

For the above-mentioned reason, according to the arrangement of the first embodiment, in the case of reproducing using a laser beam of a wavelength of 830 nm, a large CNR is obtained. Therefore, it can be seen that the magnetic superresolution phenomenon is achieved.

In order to see the reproducing power dependency of CNR, the CNR is measured with a varying power of the reproducing layer with respect to the recording bit with a mark length of 0.5 μm and a mark pitch of 0.1 μm.

First, in the arrangement of the comparative example, the magnetization direction gradually changes from the in-plane magnetization to the perpendicular magnetization. Therefore, the CNR becomes higher gradually as the reproducing laser power is raised. On the other hand, in the arrangement of the first embodiment, the CNR suddenly increases using a reproducing laser power as a threshold value.

With a rise of the reproducing laser power, when the width of the stable magnetic domain of the reproducing layer 3 becomes smaller than the width of the recording bit, it seems that the recording bit 101 at the portion subject to the temperature rise is copied to the reproducing layer 3, thereby causing a sudden increase in CNR.

In the area subject to the low reproducing laser power, a certain degree of the CNR is observed. However, this is because the signal from the recording bit 101 on the recording layer 4 is reproduced by the projection of light transmitted through the reproducing layer 3.

As described, in the present invention, by setting the reproducing laser power above a laser power required for copying the magnetization direction in the recording bit 101 to the reproducing bit 3a, a signal can be reproduced with an improved CNR compared with the conventional method. Moreover, by making the reproducing laser power higher, the CNR suddenly drops. This is because the magnetization direction in the recording bit 102 is also copied to the reproducing layer 3.

For the described reason, when adopting the magneto-optical recording medium of the present invention, the reproducing laser power is set higher than that required for copying the magnetization direction in the recording bit 101 to be reproduced to the reproducing layer 3, and smaller than the minimum laser power required for copying to the adjoining bits 102.

Next, with varying film thicknesses of the reproducing layer 3, the non-magnetic intermediate layer 9 and the recording layer 4, the respective CNRs in the recording bit with a mark length of 0.3 μm and a mark pitch 0.6 μm are measured. The results are as shown in Table 1.

TABLE 1

| Thickness of Reproducing Layer (nm) | Thickness of Intermediate Layer (nm) | Thickness of Recording Layer (nm) | CNR (dB) | Reproducing Characteristic |
|---|---|---|---|---|
| 5 | 5 | 40 | 15 | A |
| 10 | 5 | 40 | 28 | A |
| 20 | 5 | 40 | 35 | A |
| 40 | 5 | 40 | 40 | A |
| 60 | 5 | 40 | 40 | A |
| 80 | 5 | 40 | 37 | A |
| 100 | 5 | 40 | 33 | A |
| 40 | 1 | 40 | 42 | A |
| 40 | 2 | 40 | 42 | A |
| 40 | 5 | 40 | 40 | A |
| 40 | 10 | 40 | 40 | A |
| 40 | 20 | 40 | 39 | A |

TABLE 1-continued

| Thickness of Reproducing Layer (nm) | Thickness of Intermediate Layer (nm) | Thickness of Recording Layer (nm) | CNR (dB) | Reproducing Characteristic |
|---|---|---|---|---|
| 40 | 40 | 40 | 34 | A |
| 40 | 60 | 40 | 27 | A |
| 40 | 5 | 5 | 5 | A |
| 40 | 5 | 10 | 12 | A |
| 40 | 5 | 20 | 35 | A |
| 40 | 5 | 30 | 40 | A |
| 40 | 5 | 40 | 40 | A |
| 40 | 5 | 60 | 41 | A |
| 40 | 5 | 80 | 42 | A |
| 40 | 5 | 120 | 42 | A |

As is clear from Table 1, some value for the CNR is obtained with respect to the recording bit having a mark length of 0.3 μm and a mark pitch of 0.6 μm. This proves that the magnetic superresolution effect is shown by the arrangement of the present invention as in the previous case.

Figure 5:
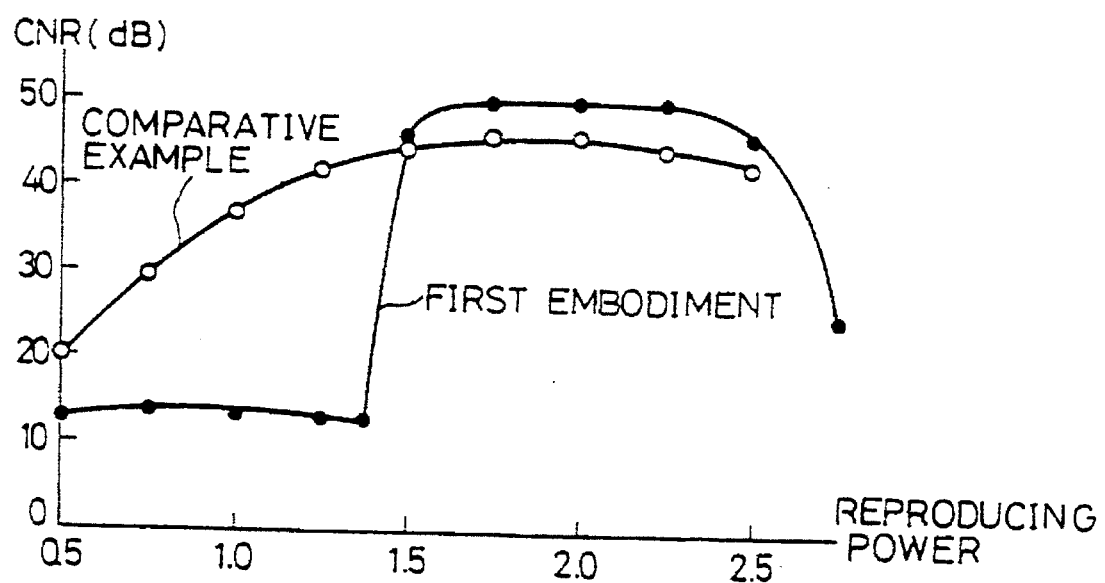
FIG. 5 is a graph showing recording and reproducing characteristics of the magneto-optical recording medium.

In Table 1, a sudden increase in CNR with an increase in reproducing laser power shown in FIG. 5 of the present embodiment, i.e., the magneto-optical recording media from which the reproducing characteristics of the present invention are observed, are marked "A" under the column of the reproducing characteristic. In the range of film thickness adopted in the experiment, although the obtained CNRs are not identical, the magnetic superresolution of the present invention is confirmed with respect to all of the magneto-optical recording media.

In the first embodiment, with respect to various compositions of the reproducing layer 3, the CNRs with a mark length of 0.3 μm and a mark pitch of 0.6 μm are observed. The results of these measurements are shown in Table 2. In Table 2, X and Y respectively show the ratio of the composition of $Gd_X(Fe_YCo_{1-Y})_{1-X}$ of the reproducing layer 3.

TABLE 2

| X | Y | CNR (dB) | Reproducing Characteristics | Recording Magnetic Field (kA/m) |
|---|---|---|---|---|
| 0.08 | 0.60 | 0 | — | — |
| 0.13 | 0.60 | 12 | A | 10 |
| 0.15 | 0.60 | 23 | A | 10 |
| 0.20 | 0.60 | 32 | A | 10 |
| 0.26 | 0.60 | 20 | A | 10 |
| 0.28 | 0.60 | 0 | — | — |
| 0.20 | 0.47 | 0 | — | — |
| 0.20 | 0.50 | 22 | A | 10 |
| 0.20 | 0.75 | 32 | A | 10 |
| 0.20 | 1.00 | 28 | A | 10 |

In the measurement of the CNR, an optical system using a laser beam with a wavelength of 830 nm is adopted. As is clear from the results shown in Table 2, some value for the CNR is obtained. This indicates that the magnetic superresolution phenomenon is shown in the arrangement of the present invention as in the aforementioned case.

In Table 2, a sudden increase in CNR with an increase in reproducing laser power shown in FIG. 5 of the present embodiment, i.e., the magneto-optical recording media from which the reproducing characteristics of the present invention are observed, are marked "A" under the column of the reproducing characteristic. The intensities of the recording magnetic field required for recording are also shown in Table 2.

From Table 2, $Gd_X(Fe_YCo_{1-Y})_{1-X}$ of the reproducing layer 3 of the present invention is required to satisfy the following conditions: With a given Y=0.60, 0.13≦X≦0.26, and with a given X=0.20, 0.50≦Y≦1.00. This is because when the reproducing layer 3 adopts $Gd_X(Fe_YCo_{1-Y})_{1-X}$ which does not satisfy the above-mentioned condition, the width of the stable magnetic domain at room temperature in the reproducing layer 3 made of GdFeCo becomes too small, thereby presenting the problem that at room temperature, the magnetic state of the recoding layer 4 would be copied to the reproducing layer 3, and thus a superresolution of the present invention cannot be achieved.

In the present embodiment, the transparent dielectric layer 2 made of AlN is adopted. However, the material of the dielectric layer 2 is not limited to AlN. For example, a transparent dielectric member made of SiN, MgO, SiO, TaO, etc., may be used as well. However, since the rare earth-transition metal alloy thin film used in the reproducing layer 3 and the recording layer 4 is easily oxidized, it is preferable to use AlN or SiN which does not include oxygen as a transparent dielectric layer.

In the present embodiment, explanations have been given through the case of using GdFeCo alloy as a reproducing layer 3. However, other materials may be used in the reproducing layer 3 as long as the width of the stable magnetic domain varies in response to changes in temperature. Example of such materials includes: rare earth-transition metal alloy such as GdFe alloy, GdDyFe alloy, GdDyFeCo alloy, etc.

In the present embodiments, the non-magnetic intermediate layer 9 made of AlN is adopted. However, as long as a non-magnetic material is used, the particular effect of the present invention can be achieved. Examples of such materials other than AlN include: a metal such as Al, Si, Ta, Ti, etc., and a dielectric member such as SiN, SiO, TaO, etc.

It is also preferable to adopt the non-magnetic intermediate layer 9 made of a metal which does not include oxygen, such as Al, Si, Ta, Ti, etc., or SiN or AlN as in the case of the transparent dielectric layer 2. Furthermore, in the case of adopting AlN for the transparent dielectric film 2, by adopting Al or AlN for the non-magnetic intermediate layer 9, similarly, in the case of adopting SiN for the transparent dielectric layer 2, by adopting Si or SiN for the non-magnetic intermediate layer 9, the effect of eliminating a new sputtering target required for forming the non-magnetic intermediate layer 9 can be achieved.

In the described preferred embodiment, the recording layer 4 made of DyFeCo alloy is adopted. However, other materials may be used for the recording layer as long as the leakage magnetic flux 107 required for reversing the magnetization in the reproducing layer 3 is permitted when reproducing. Examples of such materials include: rare earth transition metal alloy such as TbFeCo alloy, TbDyFeCo alloy, GdTbFeCo alloy, etc.

EMBODIMENT 2

The following descriptions will discuss another magneto-optical recording medium and a reproducing method using the same of the present invention.

As is clear from FIG. 1(a) and FIG. 1(b), in the reproducing method of the present invention, it is preferable that the magnetization direction in the reproducing bit in the reproducing layer 3 is arranged in one direction beforehand in other portions than a light spot of the light beam 8.

Figure 6:
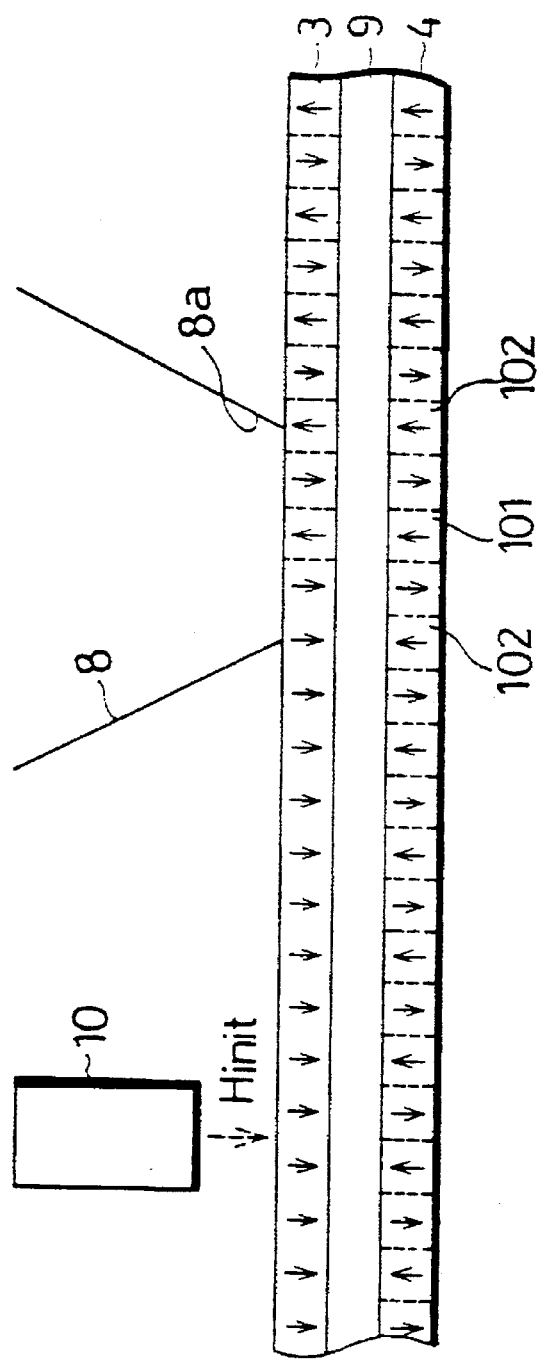
FIG. 6 is an explanatory view showing a reproducing method.

In order to arrange the magnetization direction in reproducing bits of the reproducing layer in one direction, the reproducing layer 3 is initialized using an initialization magnet 10 prior to performing a reproducing operation by projecting a light beam 8 as shown in FIG. 6.

Namely, an initialization magnetic field $H_{init}$ which is larger than the coercive force of the reproducing layer 3 and is smaller than the coercive force of the recording layer 4 is applied to the reproducing layer 3 at room temperature prior to projecting thereto the light beam 8. As a result, the magnetization direction in the reproducing layer 3 can be arranged in one direction.

In the present embodiment, it is arranged such that the width of a stable magnetic domain of the reproducing layer 3 is larger than the width of the recording bits 101 and 102 of the recording layer 4 at room temperature. Therefore, the magnetization direction in the reproducing layer 3 will not be reversed to be arranged in the magnetization direction in the recording bits 101 of the recording layer 4 until the width of the stable magnetic domain of the reproducing layer 3 becomes smaller than that of the recording layer 4 as the temperature thereof is raised by projecting thereto the light beam 8.

According to the described method, a reproducing operation can be performed from the reproducing magnetic domain 3a in the reproducing layer 3 without being affected by the magnetization direction in other portions than the reproducing magnetic domain 3a wherein magnetization directions are not arranged in one direction of the reproducing layer 3.

As a result, the magnetic superresolution can be achieved which enables the reproduction from the recording bits 101 and 102 whereon information is recorded in an area having a smaller diameter than the light spot 8a with a smaller interval.

Figure 7:
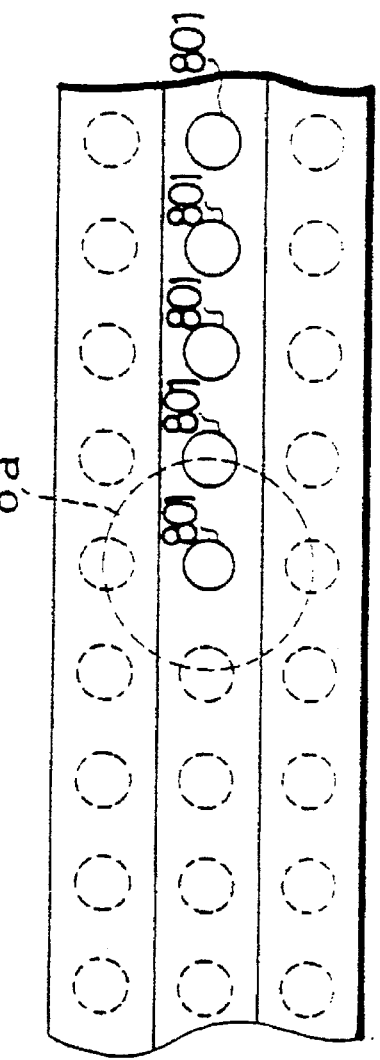
FIG. 7 is an explanatory view showing the reproducing method.

By initializing the reproducing layer 3 in the described manner, a wider composition range of the reproducing layer 3 for achieving the superresolution phenomenon of the present invention can be achieved compared with that of the first embodiment. In this case, as shown in FIG. 7, in the recording bit 801 whereon the light beam 8 has been projected, the information copied to the reproducing layer 3 is kept until the next initialization is performed, and the effect of the magnetic superresolution may be slightly reduced.

Figure 8:
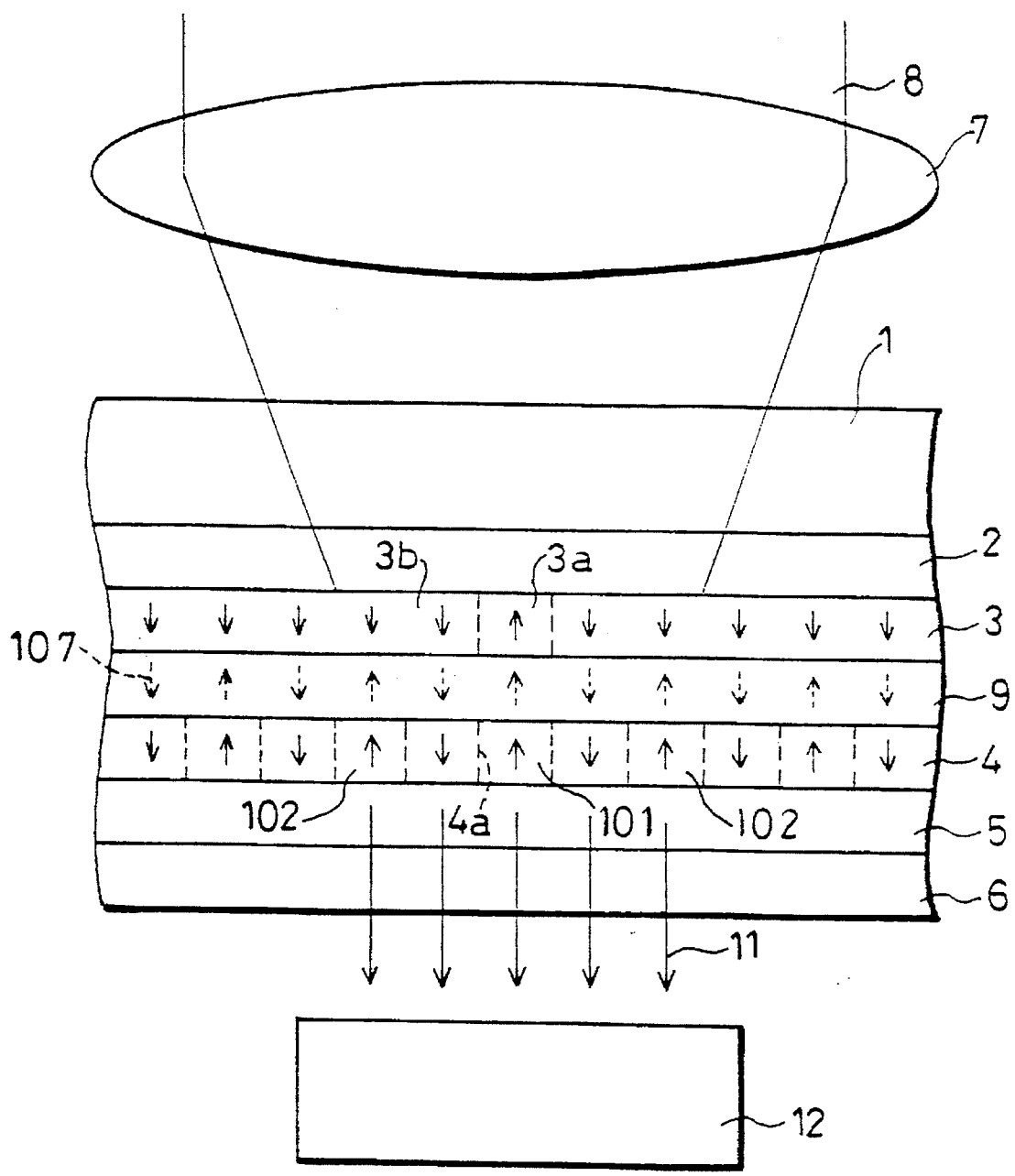
FIG. 8 is an explanatory view showing another reproducing method of the present invention.

In order to prevent the above-mentioned problem, as shown in FIG. 8, by applying a reproducing magnetic field 12 to the irradiated portion of the reproducing layer 3 with the light beam 8, the portions before and after the central portion of the irradiated area in the reproducing layer 3 can be initialized.

Namely, the temperature is raised by projecting the light beam 8, and the magnetization direction in the recording layer 4 is copied using the leakage magnetic flux 107 generated from the recording layer 4, wherein the width of the stable magnetic domain is reduced, while in the portion which is not subject to the temperature rise to not more than a predetermined value, the magnetization direction in the reproducing layer 3 can be always arranged in one direction, for example, downward, by the reproducing magnetic field 12.

In this case, as in the case of using the initialization magnet 10, a still wider composition range of the reproducing layer 3, which enables the magnetic superresolution phenomenon, can be achieved. In the meantime, the magnetization state in the reproducing layer 3 shown in FIG. 1(a) and FIG. 1(b), i.e., the reversing of the magnetization in the reproducing layer 3 at the portion subject to the temperature rise is enabled, thereby achieving the same effect of the superresolution phenomenon as that of the first embodiment. Moreover, by arranging such that the reproducing magnetic field and the recording magnetic field are generated by the same means, the present invention can be achieved without increasing the size and the cost of the apparatus.

Figure 9:
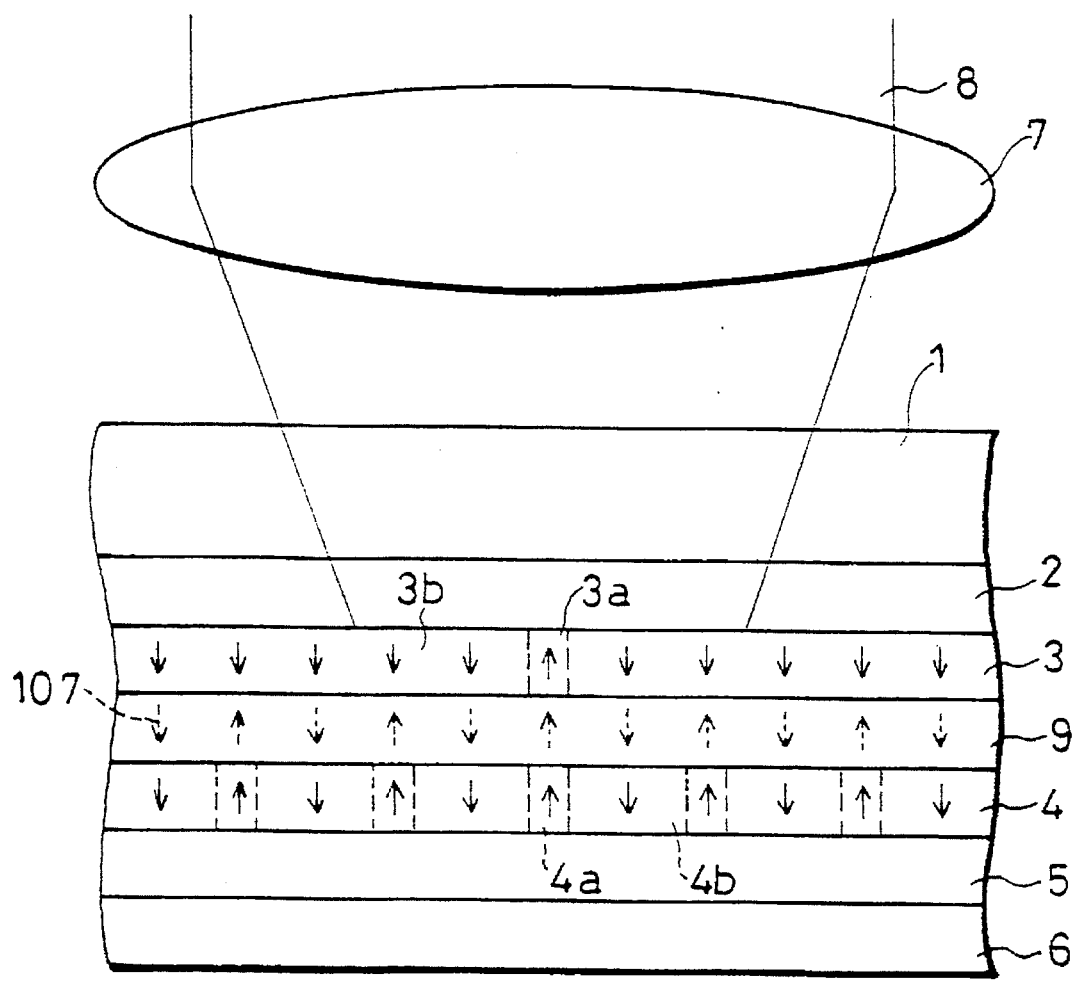
FIG. 9 is an explanatory view showing another magneto-optical recording medium and a method of reproducing from the same.

As shown in FIG. 9, the portions of the reproducing layer 3 before and after the reproducing magnetic domain 3a, whose temperature is not raised above a predetermined temperature of the reproducing layer 3 can be initialized using the leakage magnetic flux 107 generated from the recording layer 4.

Namely, on the recording layer 4, information is recorded by two magnetization directions which are in anti-parallel directions, and it is arranged such that the magnetic domains for recording therein information have mutually different widths.

More specifically, in the recording layer 4, the recording layer 4 is arranged such that the width of the magnetic domain width 4b having a larger recording bit width is smaller than the width of the stable magnetic domain of the reproducing layer 3 at room temperature. On the other hand, the magnetic domain width 4a having a smaller recording bit width in the recording layer 4 is the same or larger than the width of the stable magnetic domain in the reproducing layer 3 having a temperature rise above a predetermined temperature.

In this case, the leakage magnetic flux 107 respectively having the same directions as the recorded magnetization directions are generated from the magnetic domain 4a and the magnetic domain 4b in the recording layer 4. However, at room temperature, the magnetization direction in the reproducing layer 3 is not likely to be reversed by the leakage magnetic flux 107 generated from the recording bit of the magnetic domain 4a with a small width. Therefore, the magnetization direction in the reproducing layer 3 is arranged in the magnetization direction in the recording bit of the magnetic domain width 4b.

Consequently, other than the irradiated portion with the light beam 8, the reproducing layer 3 is initialized in the magnetization direction where the total leakage magnetic flux 107 becomes relatively larger. The magnetization direction in the reproducing layer 3 is arranged in the magnetization direction in the recording bit having a wider area in the recording layer 4 before and after the central portion except the central portion whereon the light beam 8 is projected, for example, downward, thereby initializing the reproducing layer 3.

In the described magneto-optical recording medium, when forming the recording bits 101 and 102 in the recording layer 4, it is required to perform a recording operation under the following condition: the width of the magnetic domain which is always subject to non-recording portion (downward) is relatively larger than the width of the magnetic domain of the recording portion (upward).

Figure 10:
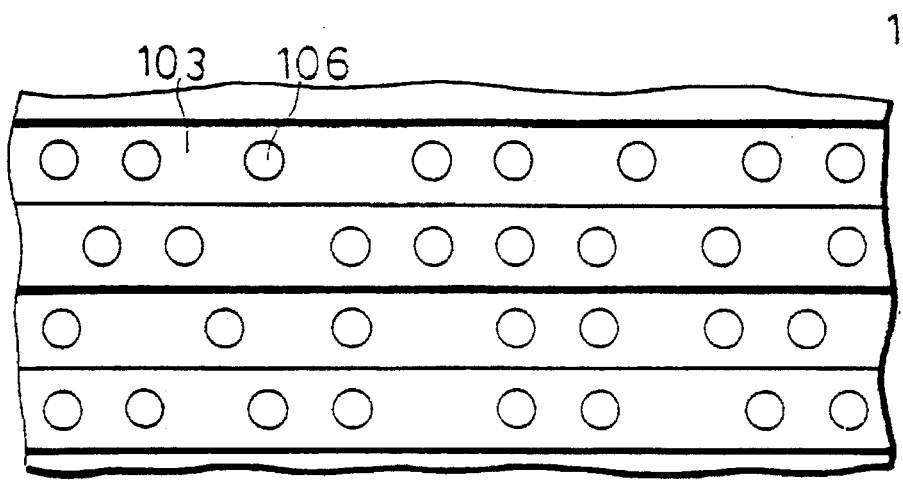
FIG. 10(a) and FIG. 10(b) are explanatory views showing a method of recording on the magneto-optical recording medium of the present invention.
Figure 10:
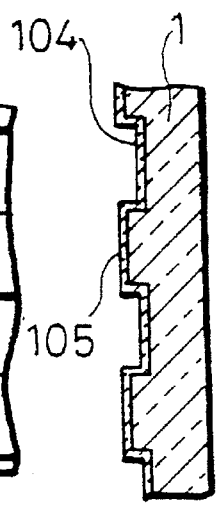

In order to set the non-recording portion relatively larger than the recording portion, as shown in FIG. 10(a) and FIG. 10(b), it is preferable to adopt the mark position recording system for recording information at the position of the recording bit 106 formed on the track portion 103 on the groove portion 104 and the land portion 105.

Figure 11:
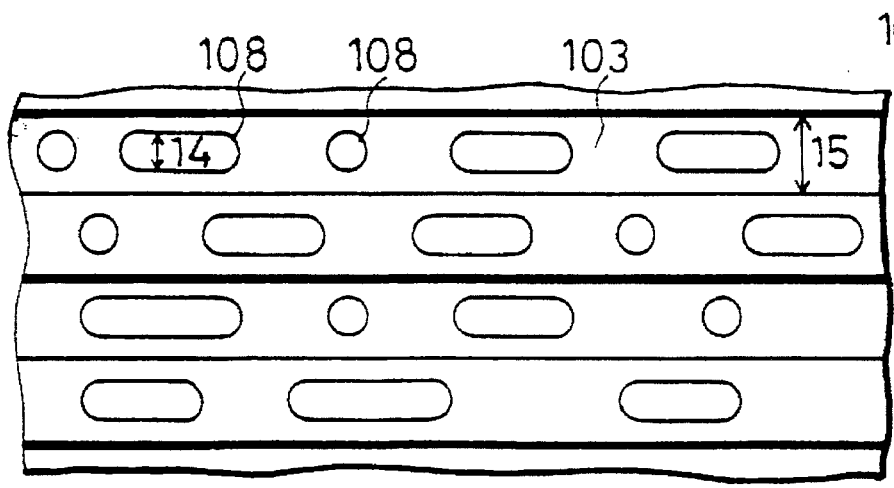
FIG. 11(a) and FIG. 11(b) are explanatory views showing another method of recording on the magneto-optical recording medium of the present invention.
Figure 11:
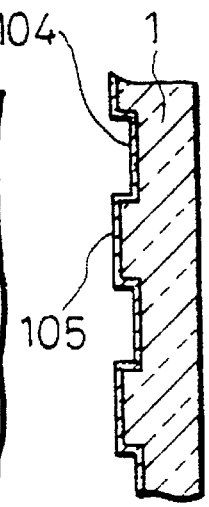

However, as shown in FIG. 11(a) and FIG. 11(b), in the mark edge recording for recording information with the length of the recording bit 108, by making the width of the recording bit 108 smaller than the width of the recording track 103 (for example, by setting the the width (14 μm) of the recording bit 108 narrower than the width (15 μm) of the recording track 103), the non-recording portion can be made relatively larger than the recording portion, thereby achieving the effect of the superresolution phenomenon of the present embodiment.

Next, when performing the mark edge recording using the land recording system, respective widths of the recording bits which enable the superresolution effect of the present invention to be achieved are examined using the magneto-optical recording medium of the first embodiment.

As shown in FIG. 12(a) and FIG. 12(b), the substrate 1 includes a land portion 301 with a pitch of 1.1 μm and a land width of 0.9 μm, and a magneto-optical recording medium of the first embodiment is formed on the substrate 1. Then, respective CNRs are measured by forming recording bits 109 with a varying width (a μm). The results are shown in FIG. 13.

As is clear from FIG. 13, in the case of adopting the recording bit having a width of 0.9 μm (a μm), an increase in the CNR in response to an increase in reproducing power is not observed, which indicates that the information on the recording layer 4 is copied to the reproducing layer 3 at room temperature. Therefore, it can be seen that the superresolution phenomenon of the present embodiment cannot be achieved by initializing the reproducing layer 3 by the leakage magnetic flux 107 generated from the recording layer 4.

On the other hand, by reducing the widths of the recording bit, i.e., 0.8 μm, 0.7 μm, 0.6 μm, 0.5 μm and 0.4 μm in this order, an increase in the CNR in response to an increase in reproducing power can be observed, thereby enabling the superresolution phenomenon of the present embodiment by initializing the reproducing layer 3 by the leakage magnetic flux 107 from the recording layer 4, i.e., by making the width of the recording bit 109 which enables the superresolution phenomenon of the present embodiment smaller than the width of the recording track 103, i.e., the width of the land portion 301.

Figure 14A:
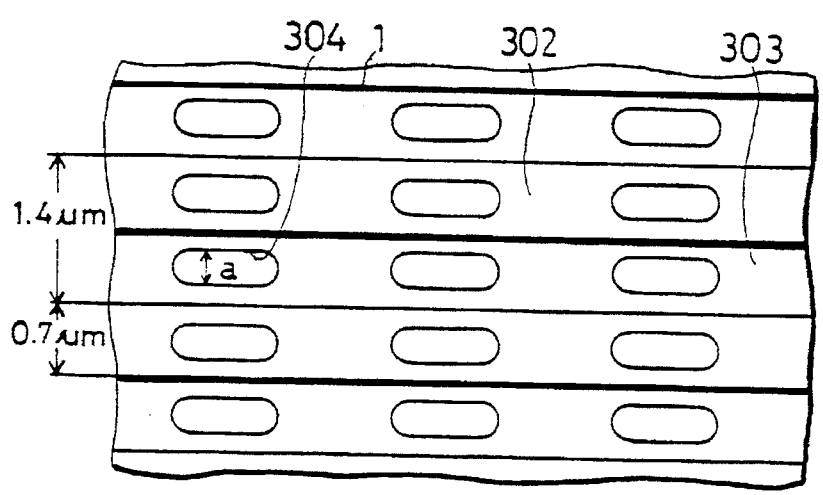
FIG. 14(a) and FIG. 14(b) are explanatory views showing a still another method of recording on the magneto-optical recording medium.
Figure 14B:
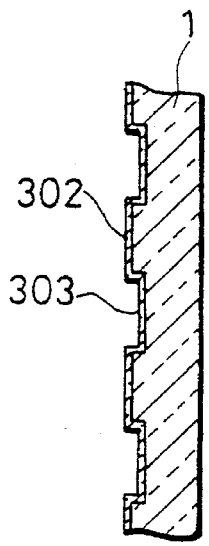

Next, as shown in FIG. 14(a) and FIG. 14(b), when performing the mark edge recording by the land/groove recording system wherein the land and groove recording system for recording both on the land portion 302 and the groove portion 303 formed between the land portions 302, the respective reproducing power dependencies are observed with respect to each recording bit width which enables the phenomenon of the superresolution of the present embodiment.

First, on the substrate 1, the land portion 302 and the groove portion 303 between the land portions 302 are formed with a pitch of 1.4 μm and a land width of 0.7 μm, and the magneto-optical recording medium of the first embodiment is formed on the land portions 302 and the groove portions 303.

Then, recording bits 304 having respective widths (a μm) are formed on the land portion 302 and the groove portion 303, and the reproducing power dependencies of the magneto-optical recording medium are observed.

Figure 15:
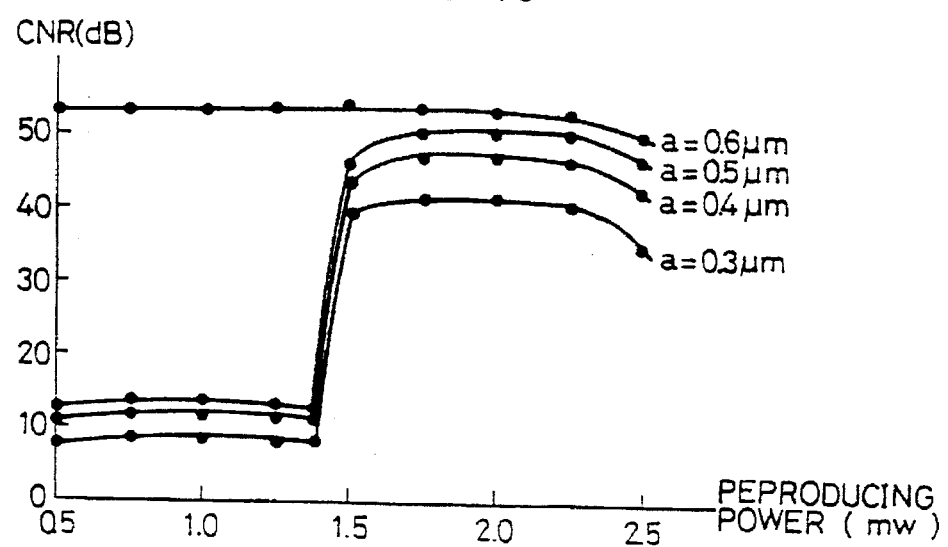
FIG. 15 is a graphs showing recording and reproducing characteristics achieved by the recording method.

The results are shown in FIG. 15. As is clear from FIG. 15, in the case of adopting the recording bit 304 having a width of 0.6 μm, an increase in the CNR with an increase in the reproducing power is not observed. This means that information on the recording layer 4 is copied to the reproducing layer 3 at room temperature. Therefore, it can be seen that the superresolution phenomenon of the present embodiment cannot be achieved by initializing the reproducing layer 3 by the leakage magnetic flux 107 from the recording layer 4.

On the other hand, as the width of the recording bit 304 is made smaller, 0.5 μm, 0.4 μm and 0.3 μm in this order, an increase in the CNR with an increase in the reproducing power is observed, and the superresolution phenomenon of the present embodiment can be achieved by initializing the reproducing layer 3 by the leakage magnetic flux 107 generated from the recording layer 4. Namely, the superresolution phenomenon can be achieved by setting the width of the recording bit which enables the superresolution phenomenon of the present embodiment than the width of the recording track, i.e., the width of the land portion 302 and the groove portion 303.

EMBODIMENT 3

The following descriptions will discuss the reproducing method of the magneto-optical recording medium in accordance with the present invention.

Figure 16:
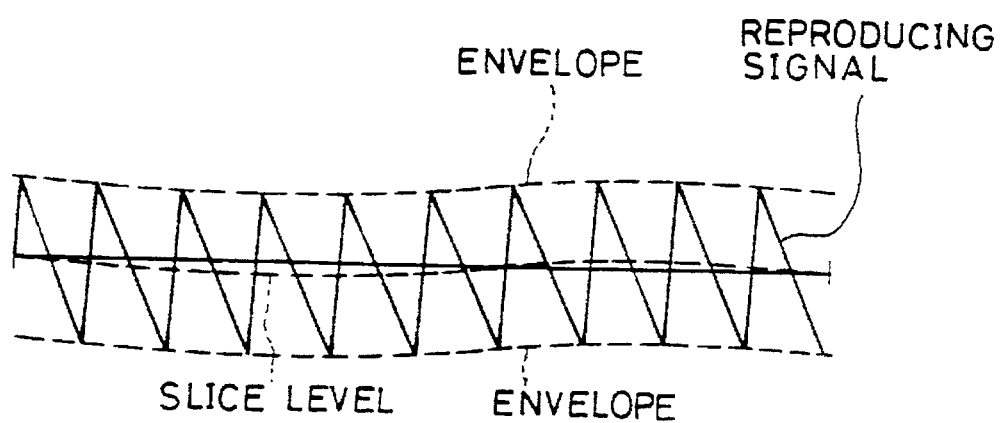
FIG. 16 is an explanatory view showing a waveform of a reproducing signal in the magneto-optical recording medium of the present invention.

When performing the land/groove recording shown in FIG. 14(a) and FIG. 14(b) with respect to the recording bit with a pitch of 0.8 μm and a diameter of 0.4 μm, the waveform of the signal outputted in reproducing has the characteristic that a rise of the reproducing signal is by far sharper than the fall of the reproducing signal as shown in FIG. 16.

Figure 17A:
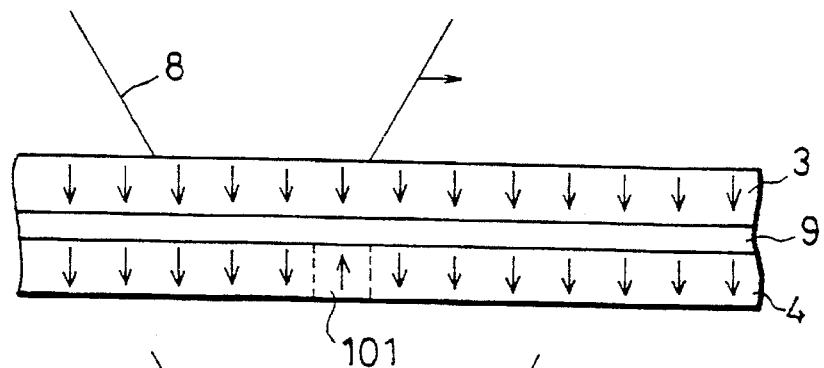
FIG. 17(a) through FIG. 17(d) are explanatory views showing a principle of obtaining the waveform.

The mechanism for generating such waveform will be explained in reference to FIG. 17(a) through FIG. 17(d). First, as shown in FIG. 17(a), as the magneto-optical recording medium rotates during the reproducing operation, the recording bit 101 on the recording layer 4 falls in the spot of the light beam 8. However, as a sufficient rise in temperature is not shown and the thus the width of the stable magnetic domain in the reproducing layer 3 is still larger than the width of the magnetic domain in the recording bit 101, the direction of the magnetic domain in the recording bit 101 is not copied to the reproducing layer 3.

Figure 17B:
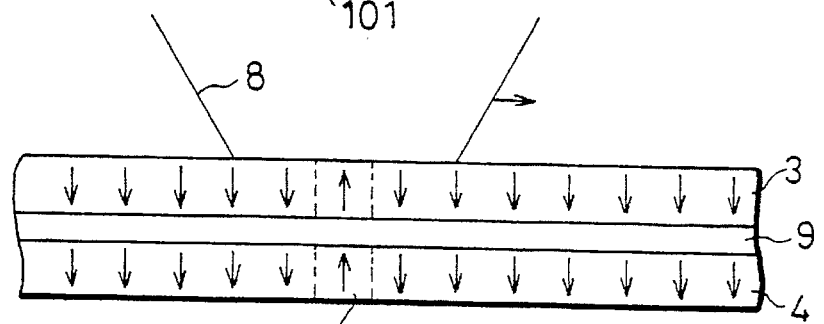

Next, when the reproducing layer 3 is shifted as the magneto-optical recording medium rotates, as shown in FIG. 17(b), the portion of the reproducing layer 3 corresponding to the recording bit 101 is heated to or above a predetermined temperature, and the width of a stable magnetic domain of the reproducing layer 3 becomes substantially identical with the width of the magnetic domain in the recording bit 101, the magnetization direction in the recording bit 101 is instantaneously copied to the reproducing layer 3, thereby causing a sudden rise of the reproducing signal as shown in FIG. 16.

Figure 17C:
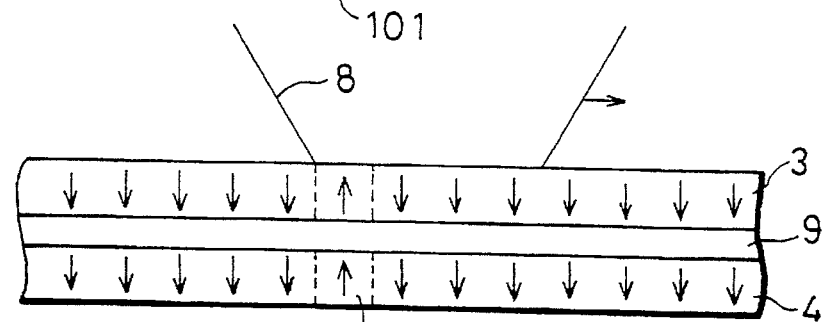

Then, as the magneto-optical recording medium is further moved, as shown in FIG. 17(c), as the temperature is cooled off gradually compared with the temperature rising process, the direction of the magnetic domain copied to the reproducing layer 3 is maintained.

Figure 17D:
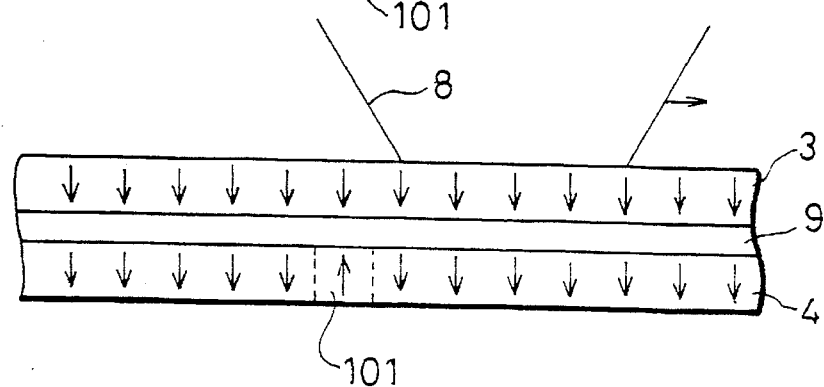

Thereafter, as the magneto-optical recording medium is further moved, as shown in FIG. 17(d), the temperature of the portion corresponding to the recording bit 101 of the reproducing layer 3 is sufficiently reduced to erase the copied magnetization direction in the domain of the reproducing layer 3 by the initialization means.

Therefore, when erasing the copied magnetization direction, about the same amount of drop in reproducing signal is shown as that in the normal reproducing operating where the recording bit is shifted outside the spot 8 as the magneto-optical recording medium is moved.

Figure 18:
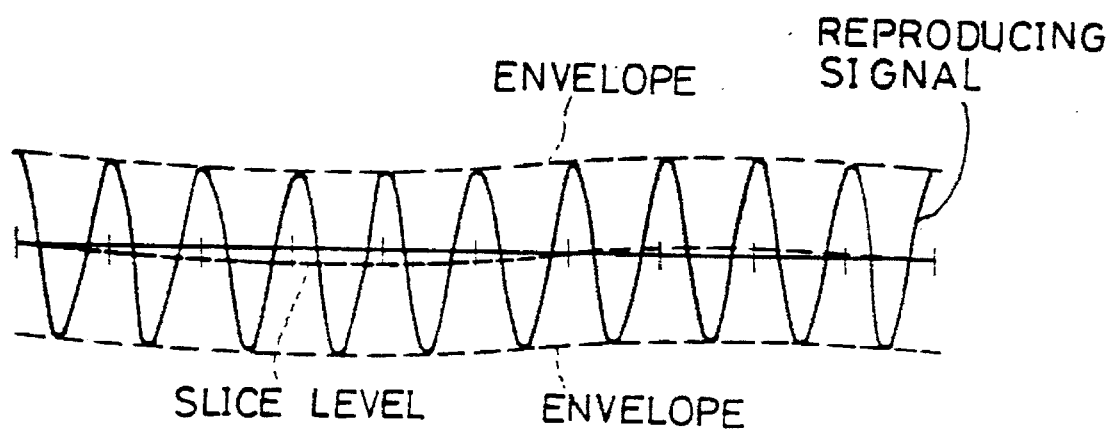
FIG. 18 is an explanatory view showing a waveform of a reproducing signal in the conventional magneto-optical recording medium.

As shown in FIG. 18, in the conventional magneto-optical recording medium composed of a generally used magnetic layer of a single layer structure, the recording bit in the spot of the light beam 8 is moved as the magneto-optical recording medium is shifted, thereby obtaining a reproducing signal of like a sine curve.

In general, since differential detecting method is adopted in the magneto-optical recording medium, the reproducing signal in which the variation in amplitude of the signal due to variations in reflectance is suppressed to a certain degree.

However, as the variation in signal amplitude remains due to variation in birefringence, etc., that cannot be suppressed by the differential detection, as shown in FIG. 16 and FIG. 18, the reproducing signal shows a smooth up-down movement. In this case, by setting the fixed voltage level to the slice level, an accurate position of the recording bit 101 cannot be detected in accordance with the smooth up-down movement of the signal amplitude.

Therefore, in order to suppress the reproducing error due to the up-down movement, a final signal is generally obtained by an envelope detection. Namely, by detecting an envelope of the reproducing signal, the slice level is set based on an average level of the envelope. As a result, the variation in detection position of the recording bit 101 due to the up-down movement can be suppressed, thereby achieving an accurate detection of the position.

In the reproducing signal shown in FIG. 16 from the magneto-optical recording medium of the present invention, a smooth up-down movement of the signal amplitude can be seen. Compared with the conventional method shown in FIG. 18 in such up-down movement, as a sudden increase in the reproducing signal is shown, when setting the slice level based on the fixed voltage level, the position of the recording bit 101 can be detected more accurately. In this case also, as in the method shown in FIG. 18, it is preferable that the envelop detection is performed to obtain the final reproducing signal.

Figure 20:
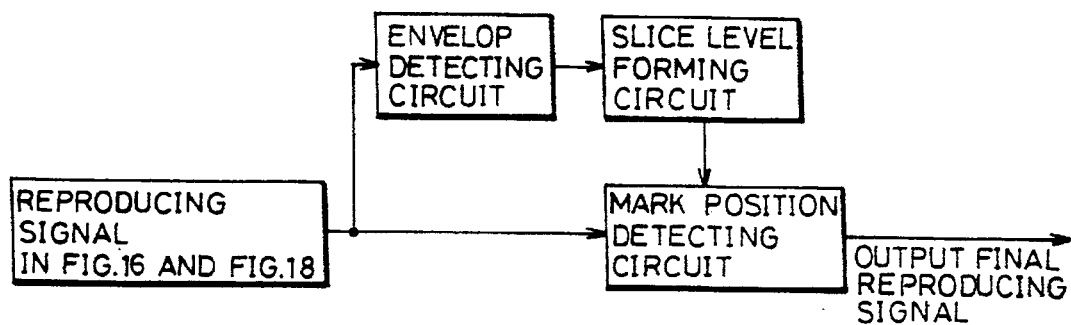
FIG. 20 is a block diagram for correcting the waveform obtained from a method of reproducing from the conventional magneto-optical recording medium.

When processing the reproducing signal by the envelop detection, as shown in the block diagram of FIG. 20, it is required to delay including the reproducing signal for the delay due to the envelop detection, thereby presenting the problem that the circuit becomes complicated, and the troublesome task of synchronizing the up-and-down movement of the slice level with the up-and-down movement of the reproducing signal by the envelop detection.

Like the conventional method shown in FIG. 18, when the reproducing signal shows a sine curve, the differentiation of the reproducing signal only results in the phase shift of the reproducing signal. Therefore, it is difficult to greatly change the waveform of the reproducing signal.

Figure 19:
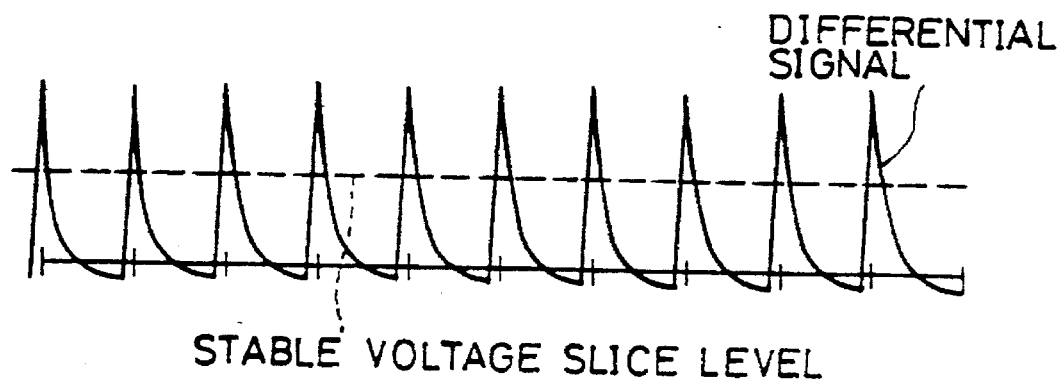
FIG. 19 is an explanatory view showing a waveform of a differentiated reproducing signal from the magneto-optical recording medium of the present invention.

In the present embodiment, as a rise in resulting reproducing signal is extremely sharp, by the differentiation of the reproducing signal, as shown in FIG. 19, the smooth variation of the amplitude of the reproducing signal can be removed from the reproducing signal, and only the portion subject to a sharp change in reproducing signal, i.e., the rising portion of the reproducing signal can be obtained as a differentiated output.

Figure 21:
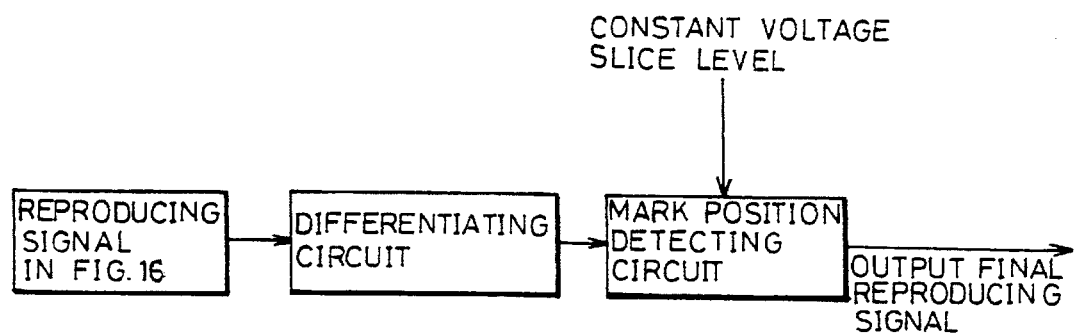
FIG. 21 is a block diagram for correcting the waveform for the method of reproducing from the magneto-optical recording medium of the present invention.

As described, according to the arrangement of the present embodiment, an adverse effect of a smooth up-down movement of the signal amplitude can be removed by differentiating the resulting reproducing signal. As a result, a final reproducing signal indicating an accurate position of the recording bit 101 can be achieved, thereby omitting the delay circuit of the conventional arrangement. The accurate process of the reproducing signal can be achieved using a simple circuit configuration using the fixed voltage slice level shown in FIG. 21.

In the reproducing method of the third embodiment from the magneto-optical recording medium, the smooth up-down movement of a signal amplitude can be removed from the resulting reproducing signal by differentiating the reproducing signal. Therefore, a final reproducing signal which detects an accurate position of the recording bit 101 can be achieved from the reproducing signal, thereby suppressing the signal quality required for the reproducing signal.

Namely, the signal having a quality of not more than 45 dB in CNR prior to signal processing cannot enable the error rate of not more than $1\times10^{-5}$. However even by the signal having a quality of not more than 35 dB prior to signal processing enables the error rate required for the magneto-optical disk as the magneto-optical recording medium is enabled, thereby achieving recording-reproducing operation at high density.

The examination data which enables such high density recording and reproduction are shown in Table 3.

TABLE 3

| Bit | Comparative Example | | Example | | |
|---|---|---|---|---|---|
| Length (μm) | CNR1 (dB) | Er1 x$10^{-5}$ | CNR2 (dB) | Er2 (x$10^{-5}$) | Er3 (x$10^{-5}$) |
| 0.8 | 50 | 0.4 | 48 | 0.3 | 0.1 |
| 0.6 | 46 | 0.4 | 49 | 0.2 | 0.1 |
| 0.5 | 43 | 1.5 | 48 | 0.3 | 0.2 |
| 0.4 | 39 | 5.0 | 46 | 0.8 | 0.3 |
| 0.35 | — | — | 40 | 1.9 | 0.5 |
| 0.3 | — | — | 35 | 8.0 | 1.0 |
| 0.25 | — | — | 25 | 20.0 | 5.0 |

As is clear from Table 3, in the CNR1 as another comparative example, if the bit length is not less than 0.6 μm, as shown under the Er1, a desired error rate (not more than $1\times10^{-5}$) is not obtained as shown under the column of Er1. On the ohter hand, in the CNR 2 having the structure of the third embodiment, even if the reproducing signal is not differentiated, as shown under the column of Er2, a desired error rate is obtained with a bit length of not less than 0.4 μm, a higher intensity than the conventional method can be achieved. Moreover, in the case where the reproducing signal is differentiated, as shown under the column of Er3, a desired error rate of not less than the bit length of 0.3 μm is obtained thereby achieving a still higher density.

In order to eliminate the deficiencies associated with the conventional method, several presentations have been made on superresolution magneto-optical reproducing technique in the MORIS'94. The No. 29-K-04 "MSR Disks with Three Magnetic Layers Using In-Plane Magnetization Films" (p. 125) of the above-mentioned presentation discloses such that by providing an intermediate layer having an in-plane magnetization between the reproducing layer and the recording layer having an in-plane magnetization at room temperature, in which a transition occurs to perpendicular magnetization at an elevated temperature, a Front mask and a Rear mask which have in-plane magnetization are formed. Further, it is also disclosed such that the reproducing signal changes sharply by the Rear mask.

The No. 29-K-06 "New Readout Technique Using Domain Collapse on Magnetic Multilayer" (p. 127) discloses such that a desirable jitter characteristic can be achieved by the sudden change in signal from the Rear mask. It is also disclosed that by differentiating the reproducing signal, the position of the recording bit can be detected accurately.

The No. 29-K-05 "Magnetically-Induced Super Resolution Using Magneto-Static Coupling" (p. 126) disclosed the technique of forming the Front mask and Rear mask which have in-plane magnetization by providing a non-magnetic intermediate layer for shutting off an exchange coupling force between a reading layer which has an in-plane magnetization at room temperature, while a perpendicular magnetization as temperature thereof is raised and a writing layer which had the perpendicular magnetization. Further, a sudden change in reproducing signal is shown by the Rear mask.

According to the above-presented arrangement, like the conventional arrangement, a transition occurs in the reproducing layer from the in-plane magnetization to the perpendicular magnetization as temperature rises. Therefore, with respect to the reproducing signal to be reproduced from the reproducing layer by projecting thereto a laser beam, an interference by unwanted signal from the reproducing layer in a transition from the in-plane magnetization to the perpendicular magnetization is shown. Therefore, the quality of the reproducing signal may deteriorates, thereby having the limit of the high density recording in the recording layer.

On the other hand, according to the arrangement and the method of the present invention, depending on whether or not the magnetization direction of the reproducing bit in the reproducing layer 3 is reversed, information on each recording bit 101 of the recording layer 4 is reproduced. As a result, the quality of the reproducing signal to be reproduced from the reproducing layer 3 can be improved compared with the above-presented technique, thereby achieving a high density recording of information on the recording layer 4.

Moreover, the techniques disclosed by the above-mentioned two publications No. 29-K-04 and No. 29-K-06, the magnetic substance is used as the intermediate layer. Therefore, they are not related to the present invention as the non-magnetic substance is used as an intermediate layer.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium, comprising:
   a recording layer composed of a magnetic thin film with perpendicular magnetization, including a recording magnetic domain for recording thereon information, said recording layer generating a leakage magnetic flux;
   a reproducing layer composed of a magnetic thin film with perpendicular magnetization, including a reproducing magnetic domain for transferring thereto a magnetization direction from said recording magnetic domain, wherein a width of a stable magnetic domain which possibly exists in a reproducing magnetic domain is larger than a width of a recording magnetic domain at room temperature and smaller than a width of the recording magnetic domain at an elevated predetermined temperature above room temperature; and
   an intermediate layer composed of a non-magnetic substance, said intermediate layer being formed between said recording layer and said reproducing layer for intercepting an exchange coupling force exerted between said recording layer and said reproducing layer.

2. The magneto-optical recording medium as set forth in claim 1, wherein:
   when a temperature of the reproducing magnetic domain is raised, and the width of the stable magnetic domain in the reproducing magnetic domain becomes identical with the width of the recording magnetic domain, a magnetization direction in the recording magnetic domain is copied to the reproducing magnetic domain by the leakage magnetic flux.

3. The magneto-optical recording medium as set forth in claim 1, wherein:

said recording layer includes a first recording domain and a second magnetic domain respectively having perpendicular magnetization directions in recording magnetic domains, the perpendicular magnetization directions being anti-parallel directions, the width of said first recording magnetic domain being larger than the width of said second recording magnetic domain, and said reproducing layer has a small stable magnetic domain width until it becomes nearly identical with the magnetic domain width of said second recording magnetic domain at an elevated temperature.

4. The magneto-optical recording medium as set forth in claim 3, wherein:

in said second recording magnetic domain, a magnetization direction is reversed according to information to be recorded, and said first recording magnetic domain adjacent to said second recording magnetic domain has a magnetization direction always fixed in one direction.

5. The magneto-optical recording medium as set forth in claim 4, wherein:

said recording layer having a track formed thereon including said first recording magnetic domain and said second recording magnetic domain, and information is recorded on the track by a mark position method for recording information by varying a position of said second recording magnetic domain as a recording bit.

6. The magneto-optical recording medium as set forth in claim 4, wherein:

said recording layer having a track formed thereon including said first recording magnetic domain and said second recording magnetic domain, and information is recorded on the track by a mark edge method for recording information by varying a length of said second recording domain as a recording bit, wherein:

said width of said first recording magnetic domain is larger than the width of said second recording magnetic domain.

7. The magneto-optical recording medium as set forth in claim 1, wherein:

a coercive force of said reproducing layer at room temperature is smaller than a coercive force of said recording layer at room temperature.

8. A method of reproducing from a magneto-optical recording medium, comprising the steps of:

preparing a magneto-optical recording medium which comprises:

a recording layer composed of a magnetic thin film with perpendicular magnetization, including a recording magnetic domain for recording thereon information, said recording layer generating a leakage magnetic flux;

a reproducing layer composed of a magnetic thin film with perpendicular magnetization, including a reproducing magnetic domain for transferring thereto a magnetization direction from said recording magnetic domain, wherein a width of a stable magnetic domain which possibly exists in a reproducing magnetic domain is larger than a width of a recording magnetic domain at room temperature and smaller than a width of the recording magnetic domain at an elevated predetermined temperature above room temperature; and an intermediate layer composed of a non-magnetic substance, said intermediate layer being formed between said recording layer and said reproducing layer for intercepting an exchange coupling force exerted between said recording layer and said reproducing layer arranging beforehand the perpendicular magnetization in said reproducing layer in one direction;

projecting a light beam onto said reproducing layer whose perpendicular magnetization is arranged in one direction beforehand, so as to raise a temperature of said reproducing layer until a width of a stable magnetic domain of the reproducing magnetic domain becomes smaller than a width of the recording magnetic domain, copying a magnetization direction in the recording magnetic domain to the reproducing magnetic domain having a temperature rise to a point where the width of the stable magnetic domain in the reproducing magnetic domain is smaller than the width of the recording magnetic domain by the light beam, and detecting a reproducing signal for reproducing information by a reflected light beam from the reproducing magnetic domain.

9. The method of reproducing as set forth in claim 8, wherein:

in said step for arranging the perpendicular magnetization direction in said reproducing layer in one direction, an external magnetic field is applied to a surface of said magneto-optical recording medium, opposite to a surface whereon a light beam is projected, and the magnetization direction in an other reproducing magnetic domain from the reproducing magnetic domain to which the magnetization direction is copied from the recording magnetic domain in response to a temperature rise by the light beam, is arranged in one direction.

10. The method of reproducing as set forth in claim 8, wherein:

said step for arranging the perpendicular magnetization direction in said reproducing layer in one direction is performed using the leakage magnetic flux generated from said recording layer as the external magnetic field.

11. The method of reproducing as set forth in claim 8, wherein:

in said step of raising the temperature of said reproducing layer, an intensity of said light beam is set to such a intensity that the width of the stable magnetic domain is smaller than the width of the recording magnetic domain only in a single reproducing magnetic domain.

12. The method of reproducing as set forth in claim 8, including the step of:

after detecting the reproducing signal from said reproducing magnetic domain, the perpendicular magnetization direction in said reproducing layer is arranged in said one direction by the external magnetic field.

13. The method of reproducing as set forth in claim 12, wherein:

said step of arranging the perpendicular magnetization direction of said reproducing layer in said one direction after detecting the reproducing signal is performed using the leakage magnetic flux generated from the recording layer as the external magnetic field.

14. The method of reproducing as set forth in claim 8, further comprising the step of:

differentiating the reproducing signal detected from the reproducing magnetic domain.

15. The method of reproducing as set forth in claim 14, further comprising the step of:

detecting a position of the recording magnetic domain based on a fixed voltage level as a slice level with respect to the differentiated reproducing signal.

* * * * *